US011532253B2

(12) United States Patent
Hajjar et al.

(10) Patent No.: US 11,532,253 B2
(45) Date of Patent: Dec. 20, 2022

(54) BEAM SCANNING ENGINE AND DISPLAY SYSTEM WITH MULTIPLE BEAM SCANNERS

(71) Applicant: Prysm Systems Inc., Milpitas, CA (US)

(72) Inventors: Roger A. Hajjar, San Jose, CA (US); Scot C. Fairchild, Santa Clara, CA (US); Arthur R. Telkamp, Livermore, CA (US)

(73) Assignee: Prysm Systems Inc., Milpitas, CA (US)

( * ) Notice: Subject to any disclaimer, the term of this patent is extended or adjusted under 35 U.S.C. 154(b) by 283 days.

(21) Appl. No.: 16/748,063

(22) Filed: Jan. 21, 2020

(65) Prior Publication Data

US 2020/0242988 A1 Jul. 30, 2020

Related U.S. Application Data

(60) Provisional application No. 62/797,132, filed on Jan. 25, 2019.

(51) Int. Cl.
| *G02B 26/08* | (2006.01) |
| *G09G 3/02* | (2006.01) |
| *G02B 26/10* | (2006.01) |
| *G02B 26/12* | (2006.01) |
| *H04N 9/31* | (2006.01) |

(52) U.S. Cl.
CPC ............ *G09G 3/02* (2013.01); *G02B 26/101* (2013.01); *G02B 26/127* (2013.01); *H04N 9/3129* (2013.01); *H04N 9/3194* (2013.01); *G02B 26/122* (2013.01); *G09G 2320/0693* (2013.01)

(58) Field of Classification Search
CPC ............ G09G 3/02; G09G 2320/0693; G02B 26/101; G02B 26/127; G02B 26/122; G02B 26/0833; G02B 26/124; G02B 26/12; H04N 9/3129; H04N 9/3194; H04N 9/3147; H04N 9/3158; H04N 9/3188; G03B 21/56
USPC ..................................................... 359/216.1
See application file for complete search history.

(56) References Cited

U.S. PATENT DOCUMENTS

| 6,888,655 B2 | 5/2005 | Yamaguchi |
| 7,869,112 B2 | 1/2011 | Borcher et al. |
| 7,878,657 B2 | 2/2011 | Hajjar |
| 8,136,951 B2 | 3/2012 | Murata et al. |
| 9,075,294 B2 | 7/2015 | Watanabe |
| 9,998,717 B2 | 6/2018 | Hajjar et al. |

(Continued)

FOREIGN PATENT DOCUMENTS

| CN | 101216659 | 7/2008 |
| CN | 102681306 | 9/2012 |

(Continued)

*Primary Examiner* — Euncha P Cherry
(74) *Attorney, Agent, or Firm* — Fish & Richardson P.C.

(57) ABSTRACT

A display system includes a display screen, a light source to generate a light beam to be modulated in accordance with image data, and a beam scanning module to receive the light beams and to direct the light beam onto an associated display region of the display screen. The beam scanning module includes a resonant scanning mirror configured to scan the light beam along a first scanning direction across the associated display region, and a polygon scanning mirror to scan the light beam along a second scanning direction across the associated display region.

19 Claims, 19 Drawing Sheets

(56) References Cited

U.S. PATENT DOCUMENTS

| | | |
|---|---|---|
| 11,128,845 B2 | 9/2021 | Hajjar |
| 2002/0180869 A1 | 12/2002 | Calllison |
| 2006/0145945 A1 | 7/2006 | Lewis et al. |
| 2006/0164707 A1 | 7/2006 | Kurihara et al. |
| 2007/0206258 A1 | 9/2007 | Malyak et al. |
| 2009/0022188 A1 | 1/2009 | Almoric et al. |
| 2009/0102830 A1 | 4/2009 | Yeo |
| 2009/0141192 A1 | 6/2009 | Nojima |
| 2010/0020377 A1 | 1/2010 | Borchers et al. |
| 2010/0097678 A1 | 4/2010 | Hajjar et al. |
| 2011/0298820 A1 | 12/2011 | Hajjar |
| 2012/0176347 A1* | 7/2012 | Mahajan ............ G09G 5/00 345/204 |
| 2013/0335641 A1 | 12/2013 | Aoki et al. |
| 2018/0007330 A1 | 1/2018 | Hajjar |
| 2018/0278898 A1 | 9/2018 | Hajjar et al. |
| 2021/0218939 A1 | 7/2021 | Hajjar |

FOREIGN PATENT DOCUMENTS

| | | |
|---|---|---|
| JP | 2005-024958 | 1/2005 |
| JP | 2006-184750 | 7/2006 |
| WO | WO 00/20912 | 4/2000 |
| WO | WO 2019/231862 | 12/2019 |

\* cited by examiner

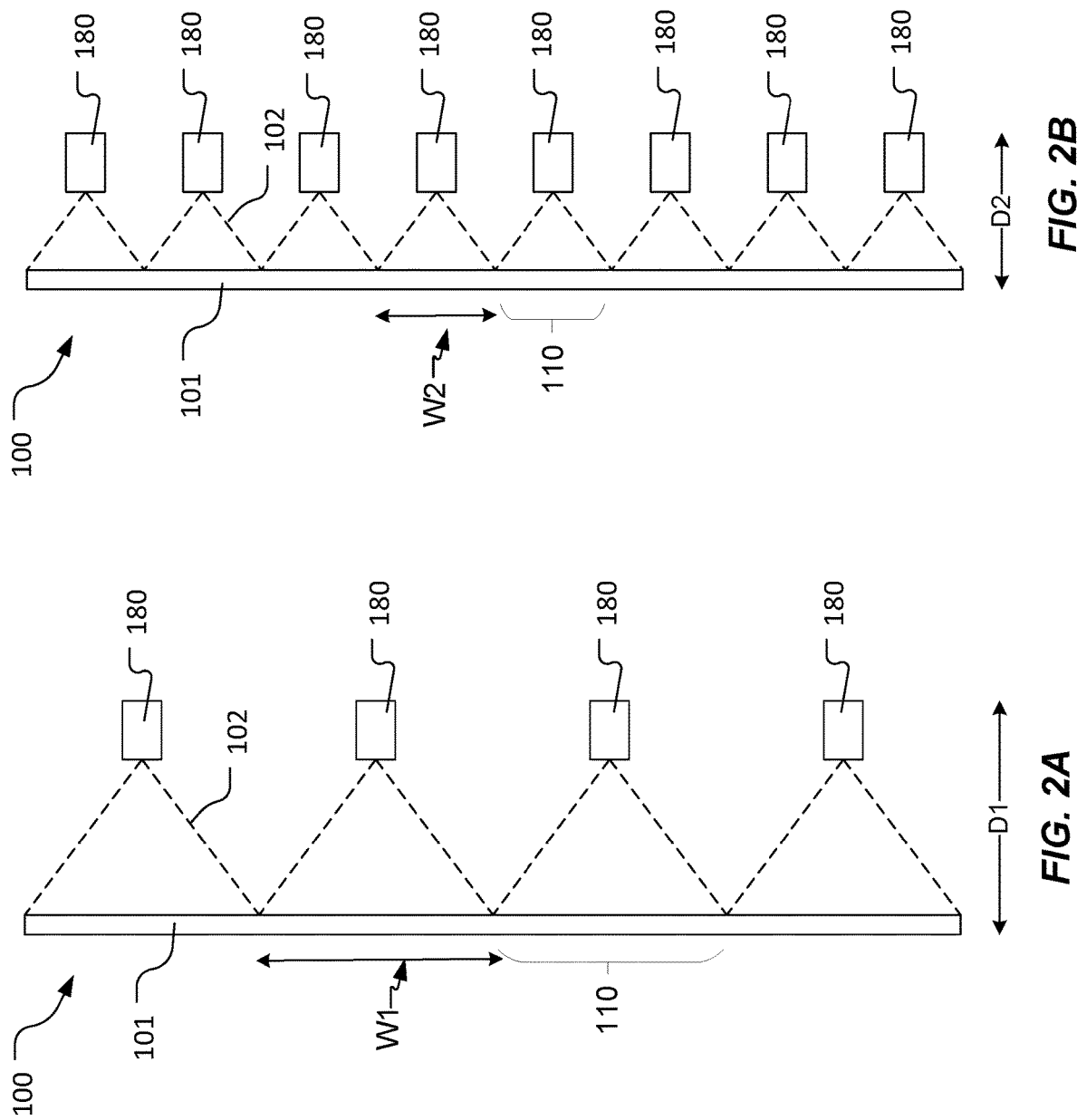

BEAM SCANNING ENGINE AND DISPLAY SYSTEM WITH MULTIPLE BEAM SCANNERS

CROSS-REFERENCE TO RELATED APPLICATIONS

This application claims priority to U.S. Provisional Application Ser. No. 62/797,132, filed on Jan. 25, 2019, the disclosure of which is incorporated by reference.

BACKGROUND

This document relates to scanning-beam display systems.

In a scanning-beam display system, an optical beam can be scanned over a screen to to form images on the screen. Some display systems, such as some laser display systems, use a polygon scanner with multiple reflective facets to provide horizontal scanning and a vertical scanning mirror, such as a galvo-driven mirror, to provide vertical scanning. In operation, one facet of the polygon scanner scans one horizontal line as the polygon scanner spins to change the orientation and position of the facet and the next facet scans the next horizontal line. The horizontal scanning and the vertical scanning are synchronized to each other to project images on the screen.

SUMMARY

Examples and implementations of techniques and display systems are described that provide a display screen that includes constituent display regions, with each display region addressed by a separate scanning beam engine.

In one aspect, a display system includes a display screen, a light source to generate a light beam to be modulated in accordance with image data, and a beam scanning module to receive the light beams and to direct the light beam onto an associated display region of the display screen. The beam scanning module includes a resonant scanning mirror configured to scan the light beam along a first scanning direction across the associated display region, and a polygon scanning mirror to scan the light beam along a second scanning direction across the associated display region. The polygon scanning mirror has a plurality of facets. The beam scanning module is configured to cause, for a first facet of the plurality of facets, the light beam to follow a path including a first plurality of scan lines extending primarily along the first direction and spaced apart along the second direction, and to cause, for a second facet of the plurality of facets, the light beam to follow a path that includes a second plurality of scan lines extending primarily along the first direction and spaced apart along the second direction, the first plurality of scan lines interlaced with the second plurality of scan lines.

Implementations may include one or more of the following features.

The polygon scanning mirror may be an N-sided polygon mirror. The resonant scanning mirror may cause the light beam to make n pluralities of interlaced scan lines extending primarily along the first direction across the display region and spaced apart along the second direction, where 1<n≤N. The value n can satisfy 6≤n≤25, e.g., 8≤n≤15. The value n can equal N. The value n can be less than N, and the light beam is deactivated for (N−n) facets of the polygon mirror.

The polygon scanning mirror can be rotatable about an axis of rotation, and the plurality of facets may have the same angle of inclination relative to the axis of rotation. The plurality of facets may be parallel to the axis of rotation.

A controller may be configured to receive image data including pixel data representing intensity values of pixels, to split the pixel data into a plurality of fields including a first field corresponding to the first plurality of scan lines and a second field, and to modulate the light beam in accordance with the image data of the first field while the light beam impinges the first facet, and to modulate the light beam in accordance with the image data of the second field while the light beam impinges the second facet.

Each of the first and second pluralities of scan lines may include the same number of scan lines. The number of scan lines may be between 36 and 200. 24 to 96 of those scan lines fall may within the display region. Between 60-80% of the number of scan lines may fall within the display region.

The light beam may be deactivated for scan lines positioned beyond opposite edges of the display region that are separated along the second direction.

A combination of oscillation of the resonant scanning mirror and rotation of polygon scanning mirror may generates a sinuous path for the light beam to traverse. The sinuous path may be a sinusoidal path. The light beam may be deactivated for portions of the sinuous path that extend beyond opposite edges of the display region that are separated along the first direction.

In another aspect, a display system includes a display screen, a light source to generate a light beam that is modulated in accordance with image data, a beam scanning module, and a controller. The beam scanning module receives the light beams and directs the light beam onto an associated display region of the display screen. The beam scanning module includes a resonant scanning mirror configured to scan the light beam along a first scanning direction across the associated display region, and a rotating N-faceted polygon scanning mirror to scan the light beam along a second scanning direction across the associated display region such that in operation a combination of oscillation of the scanning mirror and rotation of the polygon mirror creates a scan path for the light beam. The controller is configured to set a ratio between an oscillating frequency $f_{RES}$ of the resonant scanning mirror and a rotation frequency $f_{POLY}$ of the polygon scanning mirror such that the scan path completes a cycle each n facets, wherein n is an integer greater than 2 and no more than N.

Implementations may include one or more of the following features.

The value n may equal N. The n may be less than N, and the light beam may be deactivated for (N−n) facets of the polygon mirror. The oscillating frequency $f_{RES}$ of the resonant scanning mirror and a rotation frequency $f_{POLY}$ of the polygon scanning mirror may be related by $$f_{poly} = \frac{f_{res}}{n(Z + \delta)}$$

where Z is a positive integer, and 0≤δ≤1. The value δ may be an irreducible fraction that is an integer multiple of 1/n. The value Z may be equal to half of the number of oscillations of the resonant scanning mirror for period of time that the light beam is reflected from a single facet of the polygon. The value Z may be 24-40. The value δ may be equal to 1/n or (n−1)/n. The oscillating frequency $f_{RES}$ may be about 20-23 kHz.

A combination of oscillation of the resonant scanning mirror and rotation of polygon scanning mirror may generate a sinuous path for the light beam to traverse. A lateral position along the first scan direction of an end of the sinuous path for the n$^{th}$ facet may correspond to a lateral position along the first scan direction of a start of the sinuous path for the 1$^{st}$ facet. The sinuous path may be a sinusoidal path.

In another aspect, a display system includes a display screen, a light source to generate a light beam that is modulated in accordance with image data, and a beam scanning module to receive the light beams and to direct the light beam onto an associated display region of the display screen. The beam scanning module includes a resonant scanning mirror configured rotate about a first axis to scan the light beam along a first scanning direction across the associated display region, relay optics to direct the light beam from the light source to impinge the resonant scanning mirror substantially perpendicular to the first axis, and a rotating polygon scanning mirror to scan the light beam along a second scanning direction across the associated display region, the rotating polygon scanning mirror having a plurality of facets.

Implementations may include one or more of the following features.

The relay optics may be configured to direct the light beam from the light source to impinge the resonant scanning mirror at an oblique angle relative to a reflective face of the scanning mirror.

One or more light sources may generate a plurality of light beams including an imaging beam and a servo beam, and the system may include a servo feedback detector positioned to receive feedback light of the servo beam from the associated display region and to produce a monitor signal indicative of a position of the plurality of light beams on the display region, and a controller configured to receive image data including pixel data representing intensity values of pixels, to modulate the imaging beam in accordance with the image data, and to control timing of modulation of the excitation beam based on the monitor signal to align modulation based on intensity values of pixels with corresponding pixel positions on the display screen. The relay optics are may be configured to direct the imaging beam and the servo beam to impinge a coincident location on the resonant scanning mirror.

The light beam may impinge the resonant scanning mirror at an angle within 10° of perpendicular to the first axis, e.g., within 5° of perpendicular to the first axis, e.g., within 2.5° of perpendicular to the first axis.

In another aspect, a display system may include a display screen, one or more light sources to generate a plurality of light beams including an excitation beam and a servo beam and to modulate the excitation beam in accordance with image data, a beam scanning module to receive the plurality of scanning beams and to direct the plurality of scanning beams onto an associated display region of the display screen, and a controller. The beam scanning module includes a resonant scanning mirror to scan the plurality of light beams along a first scanning direction across the associated display region, relay optics to direct the excitation beam and the servo beam from the one or more light sources to impinge a coincident location on the resonant scanning mirror, a rotating polygon scanning mirror to scan the plurality of light beams along a second scanning direction across the associated display region, the rotating polygon scanning mirror having a plurality of facets, and a servo feedback detector positioned to receive feedback light of the servo beam from the associated display region, and to produce a monitor signal indicative of a position of the at least one beam on the display region. The controller is configured to receive image data including pixel data representing intensity values of pixels, to modulate the excitation beam in accordance with the image data, and to control timing of modulation of the excitation beam based on the monitor signal to align modulation based on intensity values of pixels with corresponding pixel positions on the display screen.

Implementations may include one or more of the following features.

The relay optics may direct the excitation beam and the servo beam onto the resonant scanning mirror at different angles of incidence. The excitation beam and the servo beam may trace parallel paths, e.g., collinear paths, on the display screen. The plurality of light beams may consist of the excitation beam and the servo beam. The resonant scanning mirror may be no more than about 2 mm across.

In another aspect, a display system includes a display screen having a viewing side and a light-receiving side, a plurality of subsystems, and one or more controllers. The display screen provides a plurality of display regions. Each subsystem is configured to generate an image on an associated display region of the plurality of display regions. Each subsystem includes one or more light sources, a beam scanning module, and a servo feedback detector. The one or more light sources generate a plurality of light beams including an excitation beam and a servo beam. The beam scanning module receives the plurality of light beams and directs the plurality of light beams onto the associated display region of the display screen. The beam scanning module includes a first scanning mirror configured to scan the plurality of light beams along a first scanning direction across the associated display region and a second scanning mirror to scan the plurality of light beams along a second scanning direction across the associated display region. The a servo feedback detector is positioned to receive feedback light of the servo beam from the associated display region, to detect a servo feedback mark in the associated display region from the feedback light, and to produce a monitor signal indicative of a position of the servo beam on the associated display region. The controller one or more controllers are configured to, for each subsystem of the plurality of subsystems, receive image data including pixel data representing intensity values of pixels, to modulate the excitation beam in accordance with the image data, and to control timing of modulation of the excitation beam based on the monitor signal to align modulation based on intensity values of pixels with corresponding pixel positions on the display screen. The one or more controllers are further configured to selectively activate the servo beam such that for a multiplicity of subsystems associated with a block of adjacent display regions the servo beam of only a single subsystem from multiplicity of subsystems is active at a time.

Implementations may include one or more of the following features.

The plurality of subsystems may be divided into multiple multiplicities of subsystems, each multiplicity of the multiple multiplicities associated with a block of adjacent display regions to provide multiple blocks of adjacent display regions. The one or more controllers may be configured to, for each block, activate the servo beam associated with the display region in the same relative position in the block at the same time. The multiple blocks may be rectangular arrays of display regions. Each block of the multiple blocks may have the same size. Each block may be a 2×2 block of display regions.

The second scanning mirror may be polygon scanning mirror. The one or more controllers may be configured to cycle through the display regions in the block such that subsystem having the activated servo beam changes every X rotations of the polygon scanning mirror. X may be 2 to 4. The one or more controllers may be configured to cycle through the display regions in the block such that subsystem having the activated servo beam changes every Y facets of the polygon scanning mirror. Y may be 2 to 4.

In another aspect, a display system includes a display screen having a viewing side and a light-receiving side, a plurality of subsystems, and a plurality of baffles. The display screen provides a plurality of display regions. Each subsystem is be configured to generate an image on an associated display region of the plurality of display regions. Each subsystem includes a light source to generate a light beam, a beam scanning module to receive the light beam and to direct the light beam onto the associated display region of the display screen, and a fold mirror to reflect the light beam from the beam scanning module onto the light-receiving side of the associated display region of the display screen. The beam scanning module includes a first scanning mirror configured to scan the light beam along a first scanning direction across the associated display region and a second scanning mirror to scan the light beam along a second scanning direction across the associated display region. The plurality of baffles are positioned along common edges of adjacent display regions, and are spaced apart from and extend substantially perpendicular to the display screen to block light from one subsystem associated with one display region from reaching an adjacent display region of another subsystem.

Implementations may include one or more of the following features.

The angle of the fold mirror relative to the screen may be such that secondary reflections from the fold mirror impinge the baffle.

For various aspects, a scanning speed of the light beam along the first scanning direction may be greater than a scanning speed of the light beam along the second scanning direction. The display screen may include fluorescent material, and the light beam may be an excitation beam to cause portions of the fluorescent material to fluoresce. The fluorescent material may be provided by parallel stripes extending along the second scanning direction. The excitation beam may include ultraviolet light and the servo beam may include infra-red light.

Potential advantages may include (and are not limited to) one or more of the following.

The depth of a scanning display system (e.g., the minimum distance behind the screen required by the display system) can be decreased, without significantly increasing or even while decreasing cost. Precise coordination of a beam scanned by a resonant scanning mirror with phosphor regions can be achieved using feedback from a servo beam.

The details of one or more embodiments are set forth in the accompanying drawings and the description below. Other aspects, features and advantages will be apparent from the description, drawings and claims.

BRIEF DESCRIPTION OF THE DRAWINGS

FIG. 2A is a schematic side view of an example of a display system that uses multiple beam scanners to address multiple display regions of a display screen.

FIG. 2B is a schematic side view of another example of a display system that uses multiple beam scanners to address multiple display regions of a display screen.

DETAILED DESCRIPTION

Large scale displays (also called large format displays or large screen displays) are useful as "floor to ceiling" displays, and can have an imaging surface of 8 ft. square or larger. It is generally desirable for a large scale display to be thin, so to conserve usable square footage in the area in which the display is installed.

In some display systems, particularly large scale displays, a display screen can have regions that are separately addressed by separate scanning beams. In general, the larger the region addressed by a scanning beam, the greater the depth needed by the display system. Even use of complex optical paths, e.g., involving folding mirrors and the like, may not alleviate this problem entirely. However, by using a larger number of individual beam scanners, each covering a smaller region, the depth of the display system can be reduced. Ostensibly such an approach would be cost prohibitive due the scaling of the number of components. However, use of a servo feedback system can enable the use of lower accuracy and lower cost scanning components, e.g., resonant scanning mirrors. Consequently, the depth of the display system can be decreased, without significantly increasing or even while decreasing cost.

In some display systems, each individual region of the display screen can be addressed by multiple beams that are offset from each other, e.g., along the slow scan direction, in order to provide high resolution. Unfortunately, providing these multiple beams requires multiple lasers or complex beam splitting optics, which increases the system cost. However, use of a polygon mirror scanner for the slow scan direction, with the rotation rate of the polygon mirror set at an appropriate ratio relative to the oscillation rate of the resonant scanning mirror, can permit each facet of the polygon mirror to scan a different row of pixels, thus effectively providing an interlaced display. Consequently, a desired resolution of the display system can be achieved while decreasing cost.

In some display systems, a servo beam is projected onto the display screen at the same time as an excitation beam. Reflections of the servo beam from servo marks on the display screen can provide timing information that permits calculation of the excitation beam position, and thus alignment of modulation based on image data to the beam position. Some display systems used different scanning engines for different regions of the display screen. Unfortunately, in such a system, if servo beams are active in adjacent regions, each region can be impinged by multiple servo beams. This crosstalk can result in improper calculation of the beam position. However, dividing the display into blocks of regions and activating the servo beam for only one region at time in each block can reduce crosstalk.

Figure 1A:
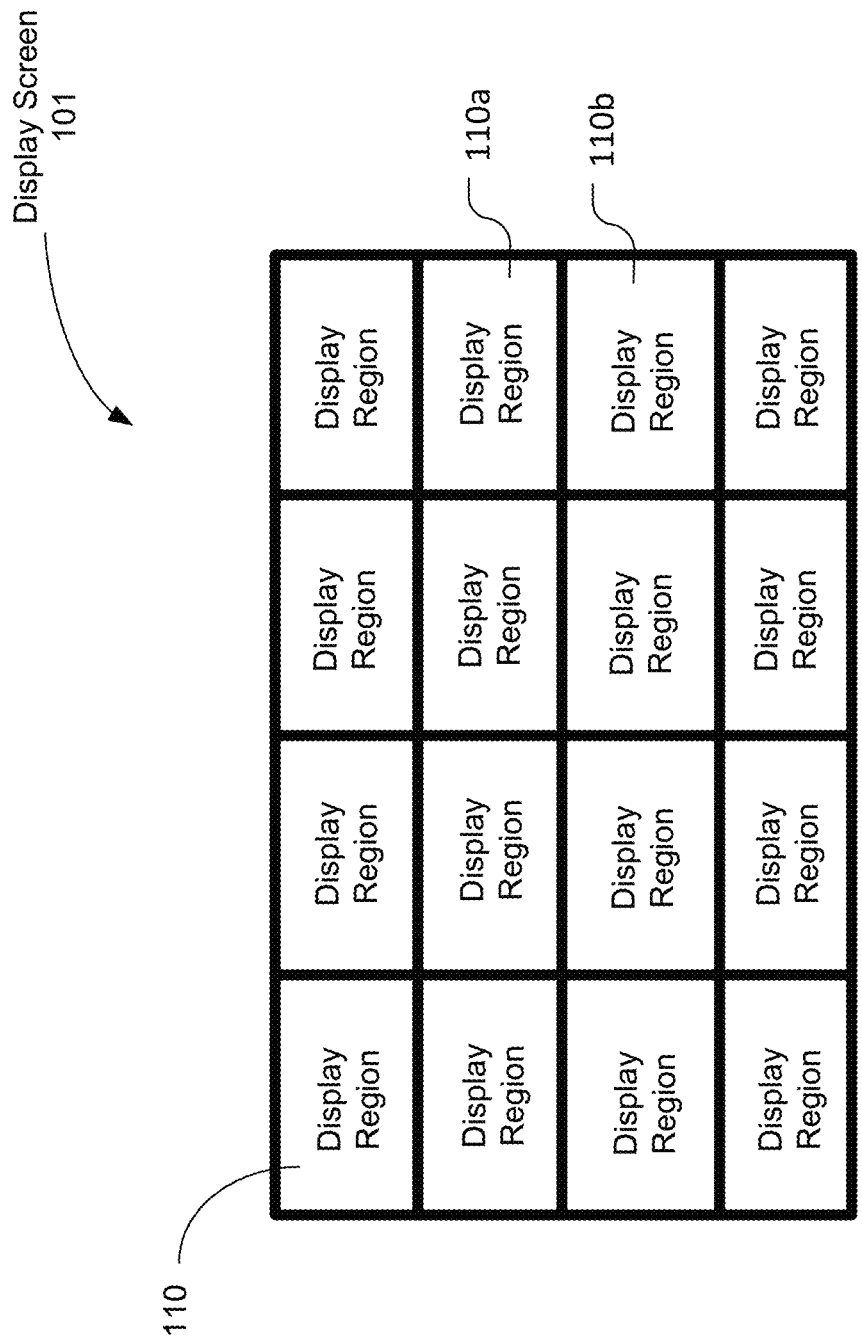
FIG. 1A is a schematic front view of an example of a display screen with multiple constituent display regions.

FIG. 1A shows an example of a display screen 101 on which multiple constituent display regions 110 are generated by multiple scanning beam engines. The display regions 110 are arranged in an array, e.g., a rectangular array. Each display region 110 can be quadrilateral, e.g., generally rectangular, although this is not required. The display regions 110 can abut or slightly overlap.

Figure 1B:
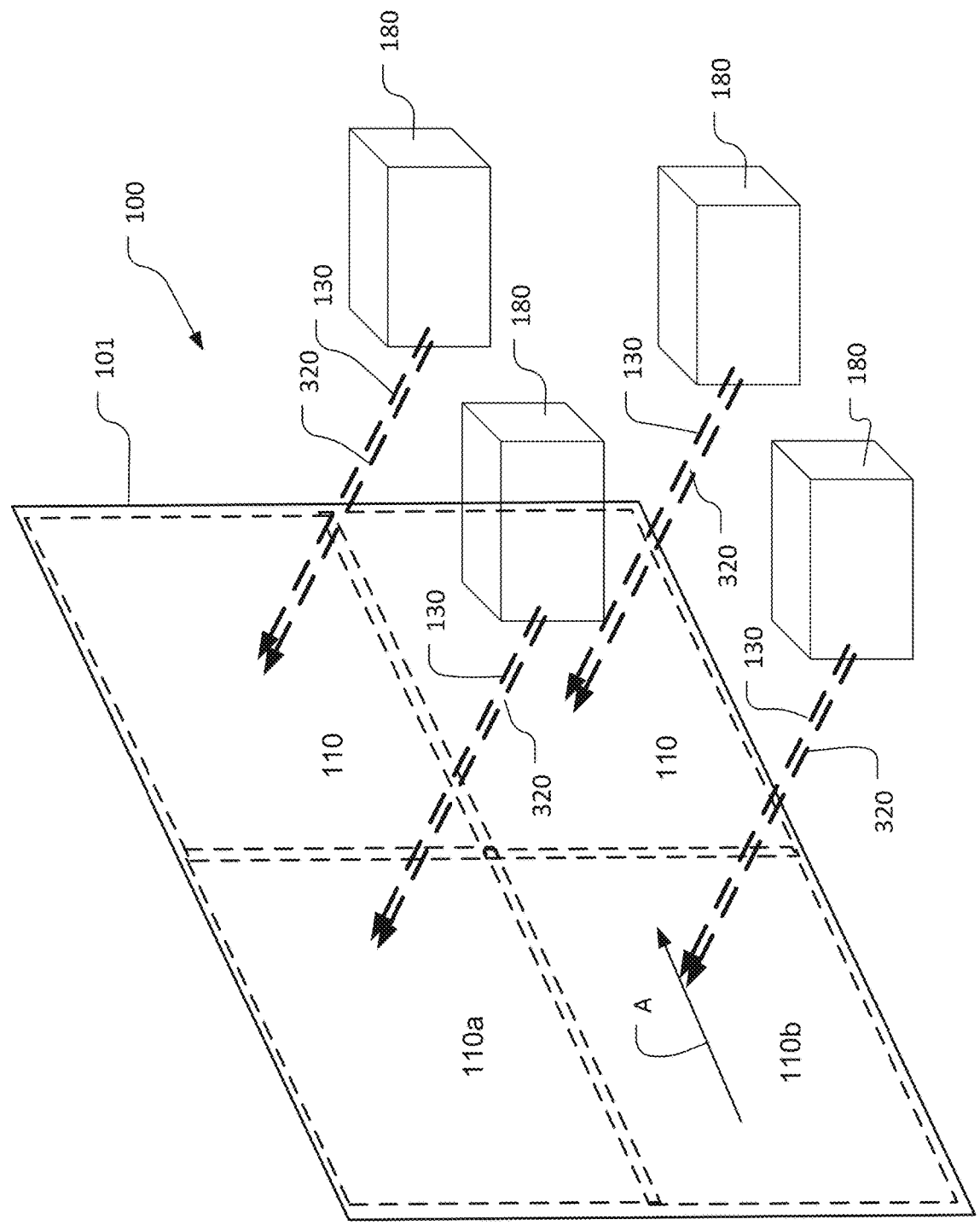
FIG. 1B is a schematic perspective view of an example of multiple scanning beams being used to address multiple display regions of a display screen.

Referring to FIGS. 1A and 1B, the display screen 101 can be part of a scanning beam display system 100. As shown in FIG. 1B, for each display region 110 there is an associated scanning beam engine 180. Each scanning beam engine 180 generates a scanning beam 320, e.g., an light beam, e.g., a laser beam, that scans, e.g., raster scans or or bi-directional raster scans (i.e., each consecutive line is scanned in an opposite direction), across the associated display region 110. The scan can have a fast scan direction, e.g., as shown by arrow A, and a slow scan direction, e.g., perpendicular to the fast scan direction.

Figure 1C:
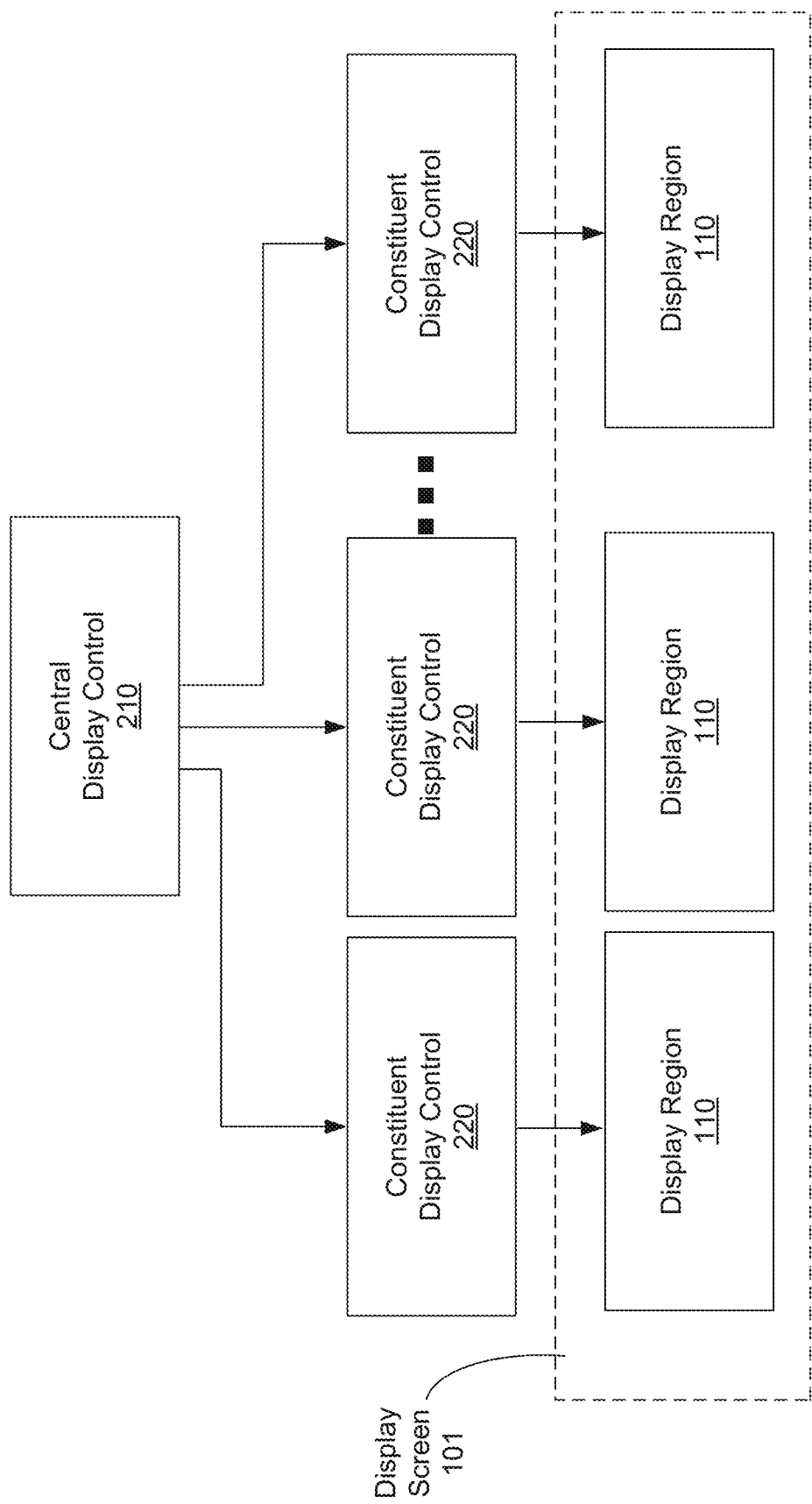
FIG. 1C is a schematic diagram of example of a control system for the display screen in FIG. 1A.

FIG. 1C shows an example of the control system for the display screen 101 in FIG. 1. In this example, each constituent display region 110 has its own display controller 220 that controls the operations of each display region 110. A central controller 210 for the display 100 is connected in communication with the display controllers 220 for the constituent display regions 110. The central controller 210 can receive image data, e.g., from a computer or the like, and divide the image data into portions that are directed to each display controller 220, which causes the associated display region 110 to display a fraction of the full image displayed by the display screen 100. Alternatively, the display could system could include just the single controller 210 directly coupled to each scanning beam engine 180.

Referring to FIG. 2A, each scanning beam engine 180 will have a field of view 102 in which an image can be effectively projected onto the display screen 101. The angle subtended by the field of view 102 is generally limited, e.g., by the maximum deflection of the physical components and/or by aperture size of optical components. As such, the distance of the scanning beam engine 180 from the screen 101, and thus the depth D1 of the display 100, will depend on the width W1 or height of the constituent display regions 110 region.

The area of the display region 110 is proportional to the larger angle of the two optical angles scanned by the fast optical scanner (e.g., the horizontal scanner) and the slow scanner (e.g., the vertical scanner), multiplied by the optical depth of the system. The optical depth is the distance from the scanner to the display screen surface. It is a function of the optical system magnification between the light source, e.g., the laser diode, and the display screen. Example, for a laser diode to be imaged on the panel using an aspherical lens, the distance from the lens to the panel can be 100-150 mm, the optical depth is less than the 100-150 mm, Although complex optical paths, e.g., involving folding mirrors and the like, can shift the position of the beam engine to reduce the depth D1 of the display 100 somewhat, they do not alleviate this problem entirely. Moreover, precision controllable galvos are expensive, such that having multiple display regions will accordingly be expensive.

However, referring to FIGS. 2A and 2B, by reducing the width of the constituent display regions 110 (shown by width W2 in FIG. 2B), the distance of the scanning beam engine 180 from the screen 101 can also be reduced, and thus the depth D2 of the display 100 will also be reduced.

Notably, the reduction in the size of the display region 110 while keeping the same size of the display screen 101 will necessitate a larger number display regions 110 and thus a larger number of scanning beam engines 180. For example, if the dimensions of the display regions are halved, the number if the scanning beam engines increases by a factor of four. In general, such an approach would be counterintuitive, because scaling of the number of beam scanning components would be cost prohibitive. However, use of a servo feedback system can enable the use of lower accuracy and lower cost scanning components, e.g., resonant scanning mirrors. Consequently, the depth of the display system can be decreased, without significantly increasing or even while decreasing cost.

Returning to FIGS. 1A and 1B, in a scanning beam display system 100, each display region 110 of the screen 101 can include light-emitting materials or fluorescent materials that emit light under excitation from the associated scanning beam 320. In some implementations, three different color phosphors that are optically excitable by the laser beam to respectively produce light in red, green, and blue colors suitable for forming color images may be formed on the screen as pixel dots or repetitive red, green and blue phosphor stripes in parallel.

Phosphor materials are one type of fluorescent materials. However, other optically excitable, light-emitting, non-phosphor fluorescent materials can be used. For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

A scanning beam display system uses at least one scanning beam to excite color light-emitting materials deposited on a screen to produce color images. The scanning beam is modulated to carry image information in red, green and blue color channels and is controlled in such a way that the scanning beam excites the color light-emitting materials in red, green and blue colors with images in red, green and blue colors, respectively. Hence, the scanning beam carries the image information but does not directly produce the visible light seen by a viewer. Instead, the light-emitting fluorescent materials on the screen absorb the energy of the scanning beam and emit visible light in red, green and blue to generate actual color images seen by the viewer. Of course, the display system 100 can use different and/or additional colors.

Figure 3:
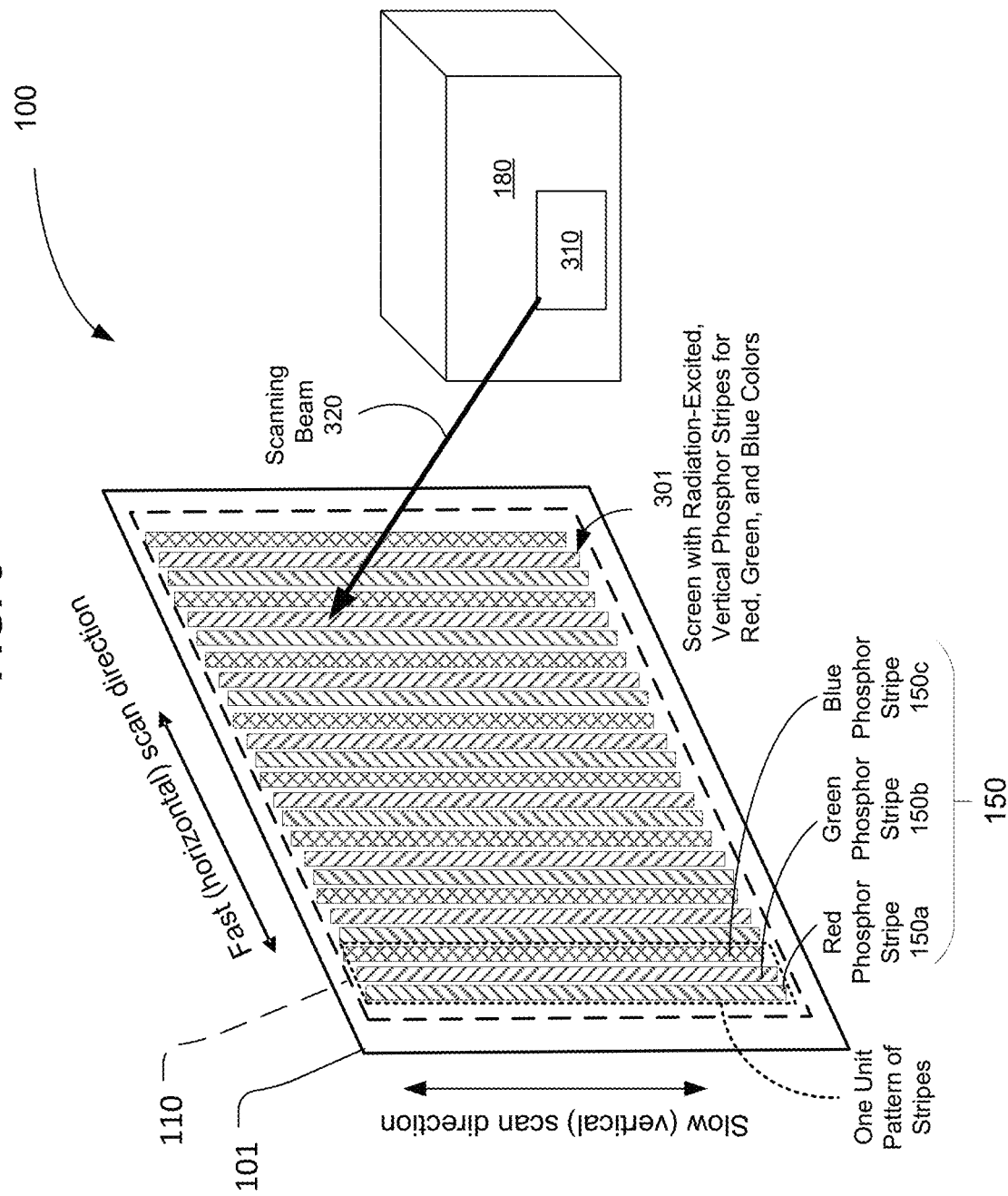
FIG. 3 is a schematic perspective view of an example scanning laser display system having a light-emitting screen made of laser-excitable light-emitting materials (e.g., phosphors) to emit colored light under excitation of a scanning laser beam that carries the image information to be displayed.

FIG. 3 illustrates an example of a scanning beam display system 100. The system includes a scanning beam engine 180 that includes a light source 310, e.g., a laser module, to produce and project at least one scanning beam 320, e.g., a laser beam, onto a display region 110 of the screen 101. The display system 100 is configured as rear scanning system where the viewer and the scanning beam engine 180 are on the opposite sides of the screen 101. Although this system illustrates only a single scanning beam engine 180, the discussion below can be applied to each scanning beam engine 180 and each display region of the screen 101.

The scanning beam 320 provides an optical excitation beam to excite fluorescent material in the screen. In some implementations, each scanning beam engine 180 generates only a single optical excitation beam 320. Each scanning beam engine 180 is configured to drive the scanning beam 320 in a fast scan direction, e.g., horizontally, and in a slow scan direction, e.g., vertically, that can be substantially perpendicular to the fast scan direction. The scan frequency (number of traversals of the screen per second) in the fast scan direction can be thirty to one-hundred times faster than the scan frequency in the slow scan direction.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range.

The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, a violet or a UV laser beam is used as an example of the excitation light for a phosphor material or other fluorescent material and may be light at other wavelength.

In the example scanning beam display system illustrated in FIG. 3, the screen 101 has parallel color phosphor stripes 150 that extend in the vertical direction. Pairs of adjacent phosphor stripes 150 are made of different phosphor materials that emit light in different colors. In the illustrated example, red phosphor 150*a* absorbs the laser light to emit light in red, green phosphor 150*b* absorbs the laser light to emit light in green and blue phosphor 150*c* absorbs the laser light to emit light in blue. Three adjacent color phosphor stripes are in three different colors. One particular spatial color sequence of the stripes is shown in FIG. 1 as red, green and blue. Other color sequences may also be used. The fast scan direction of the scanning beam engine 180 can be perpendicular to the color phosphor stripes, and the slow scan direction of the scanning beam engine 180 can be parallel to the color phosphor stripes.

The excitation beam 320 is at the wavelength within the optical absorption bandwidth of the color phosphors and is usually at a wavelength shorter than the visible blue and the green and red colors for the color images. As an example, the color phosphors may be phosphors that absorb UV light in the spectral range below 420 nm to produce desired red, green and blue light.

The light source 310 can include one or more lasers, e.g., UV diode lasers, to produce the beam 320, a beam scanning mechanism to scan the beam 320 horizontally and vertically to render one image frame at a time on the screen 101, and a signal modulation mechanism to modulate the beam 320 to carry the information for image channels for red, green and blue colors.

Each scanning beam engine 180 can include a laser source to produce a scanning laser beam that excites a phosphor material on the screen. The laser source can be a single mode laser or a multimode laser. The laser may also be a single mode along the direction perpendicular to the elongated direction phosphor stripes to have a beam spread that is confined by and is smaller than the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multi-modes to ensure sufficient brightness of the screen.

Although phosphor stripes are described above, alternatively, the display screen 101 could include color pixilated light-emitting areas that define the image pixels on the screen.

Figure 4A:
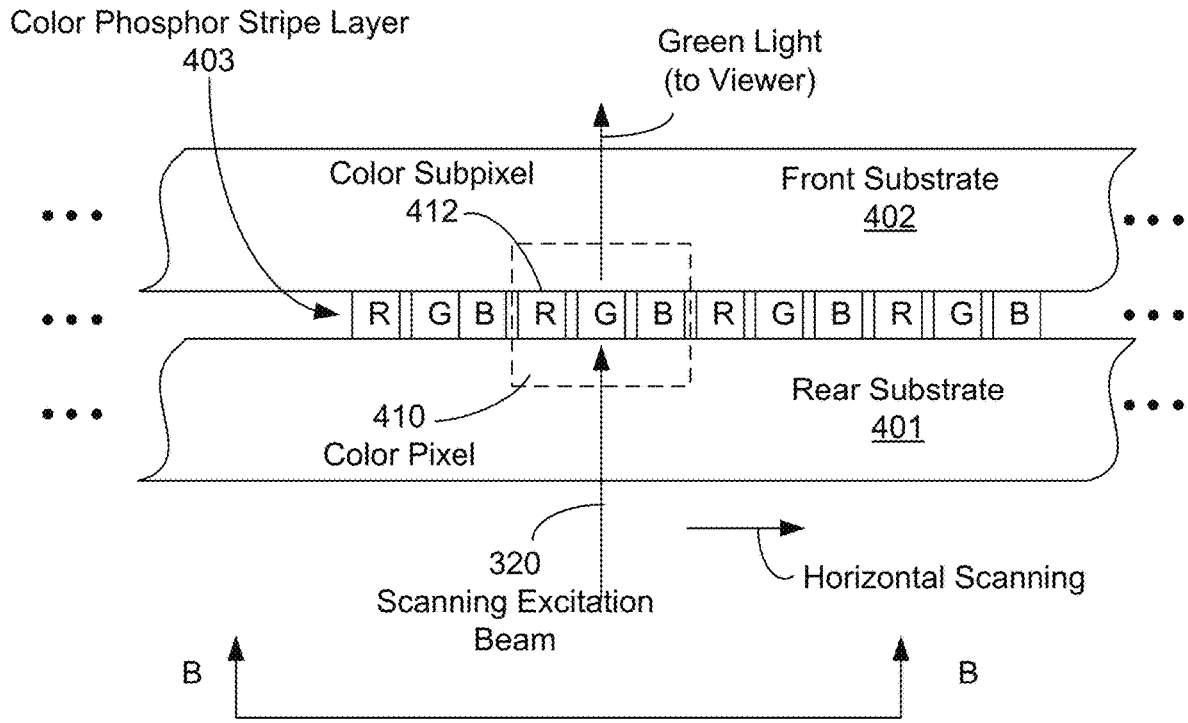
FIGS. 4A and 4B are a schematic cross-sectional side view and schematic top view, respectively, of one example screen structure with parallel light-emitting stripes and the structure of color pixels on the screen in FIG. 2.

FIG. 4A shows an exemplary design of the screen 101 in FIG. 3. The screen 101 may include a rear substrate 401 which is transparent to the scanning beam 320 and faces the light source 310 to receive the scanning beam 320. A front substrate 402 is fixed relative to the rear substrate 401 and faces the viewer in a rear scanning configuration.

A color phosphor stripe layer 403 is placed between the substrates 401 and 402 and includes phosphor stripes. The color phosphor stripes for emitting red, green and blue colors are represented by "R", "G" and "B," respectively. The front substrate 402 is transparent to the red, green and blue colors emitted by the phosphor stripes. The substrates 401 and 402 may be made of various materials, including glass or plastic panels. The rear substrate 401 can be a thin film layer and can be configured to reflect the visible energy toward the viewer. In some implementation, the front substrate is not used; the color phosphor stripe layer is exposed.

Each color pixel includes portions of three adjacent color phosphor stripes in the horizontal direction and its vertical dimension is defined by the beam spread of the scanning beam 320 in the vertical direction. As such, each color pixel includes three subpixels of three different colors (e.g., the red, green and blue). The module 180 scans the scanning beam 320 along the fast direction, e.g., from left to right and/or right to left, to form one line at a time along the slow direction, e.g., from top to bottom, to fill the screen 101.

Figure 4B:
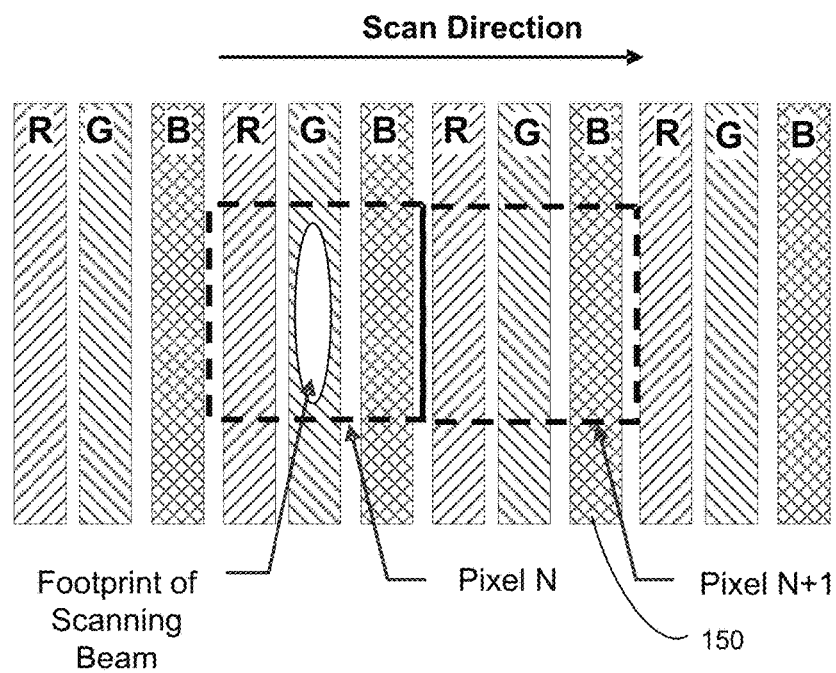

FIG. 4B further shows the operation of the screen 101 in a view along the direction B-B perpendicular to the surface of the screen 101. Since each color stripe 150 is longitudinal in shape, the cross section of the beam 320 may be shaped to be elongated along the direction of the stripe to maximize the fill factor of the beam within each color stripe for a pixel. This may be achieved by using a beam shaping optical element in the scanning beam engine 180.

Figure 5A:
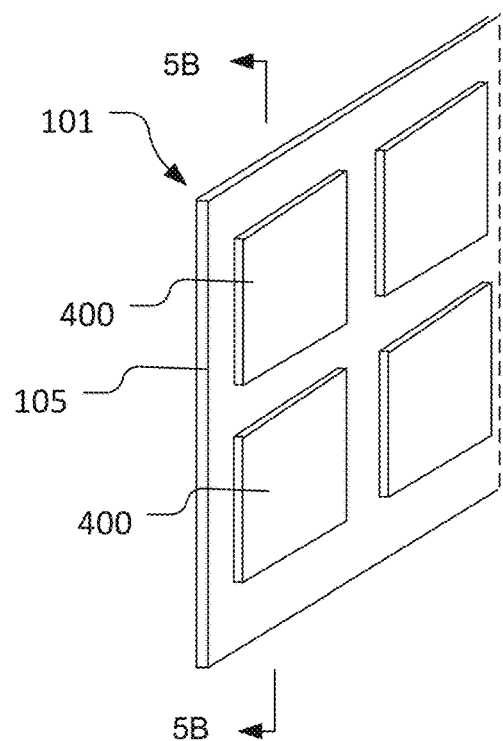
FIGS. 5A and 5B are a schematic perspective view and a schematic cross-sectional side view, respectively, of an example of a display screen with multiple sub-screens.
Figure 5B:
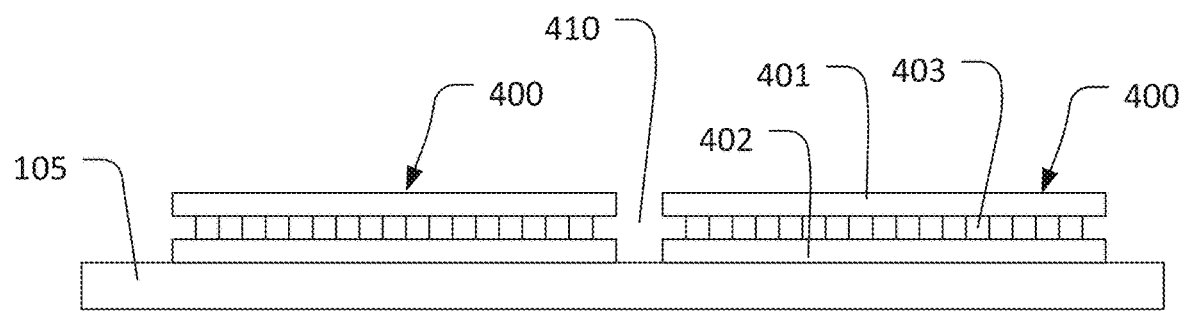

Referring to FIGS. 5A and 5B, the display screen 101 can be include multiple discrete display panels 400, with each panel 400 including a color phosphor stripe layer 403 placed between a front substrate 402 and a rear substrate 401, as described above for FIG. 4A. In particular, as shown in FIG. 5B, in some implementations, the display screen 101 includes a continuous backing sheet 105. Each panel 400 is secured to the backing sheet 105.

Assuming the panels 400 are secured to the side of the backing sheet 105 farther from the viewer, the front substrate 402 is closer to the backing sheet 105 than the rear substrate 401. Again assuming the panels 400 are secured to the side of the backing sheet farther from the viewer, the backing sheet 105 is a transparent to the visible light from the phosphors. For to example, the backing sheet can be a hard plastic. Alternatively for this configuration, the backing sheet 105 could itself serve as the front substrate, i.e., there is no substrate 402 between the color phosphor stripe layer and the backing sheet 105.

Alternatively, the panels could be secured to the side of the backing sheet closer to the viewer. In this case, the rear substrate 401 is closer to the backing sheet 105 than the front substrate 402, and the backing sheet 105 is transparent to the scanning beam 320. Alternatively for this configuration, the backing sheet 105 could itself serve as the back substrate, i.e., there is no substrate 401 between the color phosphor stripe layer and the backing sheet 105. Alternatively for this configuration, the backing sheet 105 could itself serve as the front substrate, i.e., there is no front substrate 402 between the color phosphor stripe layer and the backing sheet 105.

Figure 5C:
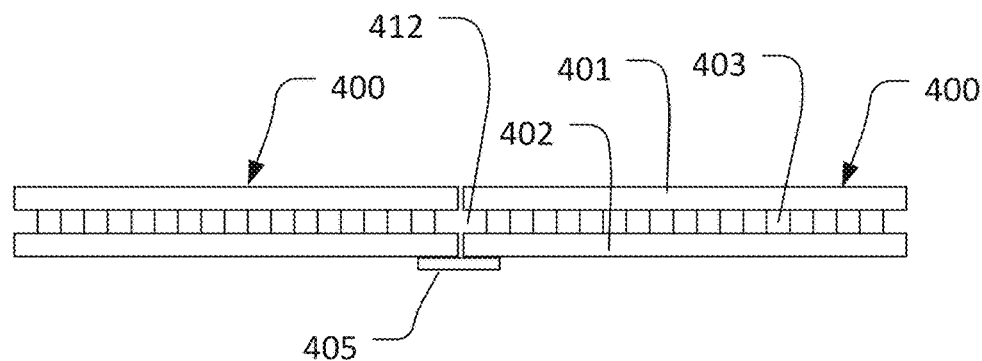
FIG. 5C is a schematic cross-sectional side view of another example of a display screen with multiple sub-screens.

Alternatively, as shown in FIG. 5C, the display screen 101 could be assembled from multiple panels 400 without a backing sheet 105, e.g., by taping edges of individual panels 400 together with tape 405.

In general, due to manufacturing constraints, there will be a gap 410 between the panels 400. Even if the panels 400 directly abut, e.g., as shown in FIG. 5C, there can be a gap 412 between color phosphor stripes 150 from adjacent panels that is larger than the gap between stripes within each panel 400.

In some implementations, each panel 400 corresponds to one of the display regions 110. That is, there is a number of panels 400 equal to the number of scanning beam engine 180, with each scanning beam engine configured 180 to address a corresponding panel 400. The edges of a display region 110 can generally align with the gaps 410 or 412 between adjacent panels 400. If there is still an overlap of the display regions 110 at their edges, then the scanning beam engines may be configured to compensate for such overlap, as discussed in U.S. Pat. No. 9,888,218, incorporated by reference.

Figure 6A:
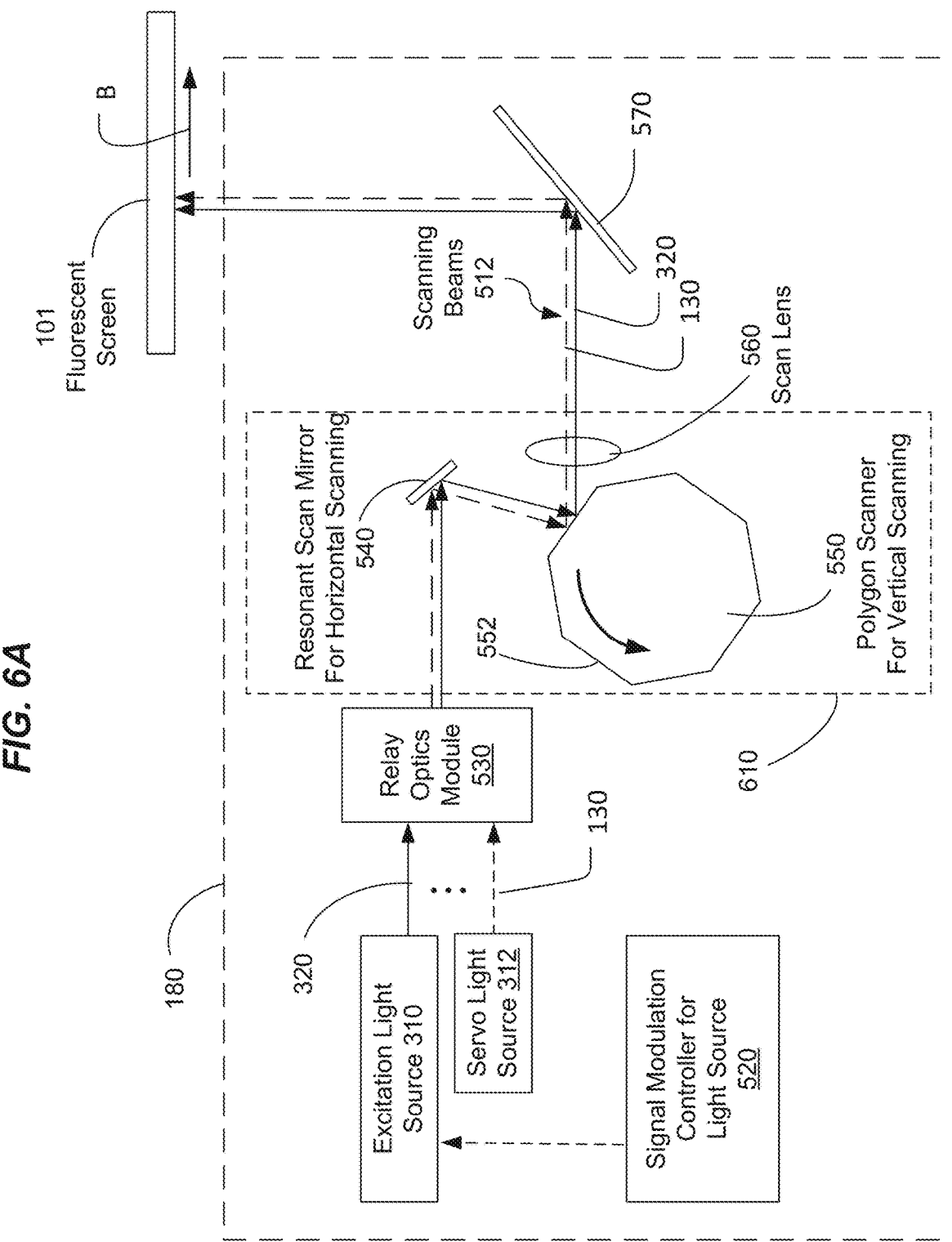
FIG. 6A is a schematic diagram of an example implementation in a pre-objective scanning configuration.

FIG. 6A shows an example implementation of one single scanning beam engine 180 from the array of scanning beam engines. The scanning beam engine 180 includes an excitation light source 310 to generate a single excitation beam 320 to scan the screen 101. The excitation beam 320 can be a laser beam, and the excitation light source 310 can be a laser.

The scanning beam engine 180 can also include a servo light source 310 to generate a single servo beam 130 to scan the screen 101. The servo beam 130 can have a different wavelength than the excitation beam 320. For example, the excitation beam can be in the ultraviolet range, whereas the servo beam 130 can be in the infrared range. The servo light to beam 130 can be a laser beam, and the servo light source 310 can be a laser. In some implementations, the servo light source 312 is an IR laser and the excitation light 310 source is a UV laser.

Thus, in this implementation the scanning beam engine generates exactly two scanning beams 512, i.e., the excitation beam 320 and the servo beam 130.

A signal modulation controller 520 is provided to control and modulate the excitation beam 320. For example, the modulation controller 520 can control and modulate the excitation light source 310 so that the excitation light beam 320 is modulated to carry the image to be displayed in the corresponding display region 110 on the screen 101. The signal modulation controller 520 can include a digital image processor that generates digital image signals for the three different color channels. The signal modulation controller 520 can include laser driver circuits that produce control signals carrying the digital image signals. The control signals are then applied to modulate the light source 310, e.g., the current for a laser diode.

The beam scanning can be achieved by a scanning module 610. Relay optics 530, e.g., mirrors, focusing lenses, etc., can be used to direct the excitation beam 320 and servo beam 130 to the scanning module 610. The excitation beam 320 and servo beam 130 can have their own separate lenses rather than a common lens. The focal points for each lens can be on the surface of the screen 101, e.g., the panel (rather than on the scanning mirror 540 discussed below).

The scanning module includes a scanning mirror 540, in particular a resonant scanning mirror, to scan the beams 130, 320 along the fast scanning direction, e.g., the horizontal scanning direction. The resonant scanning mirror can scan the beams 512 along a single axis. When driven, a resonant scanning mirror can undergo a oscillation with the angle of the mirror varying sinusoidally.

Figure 6B:
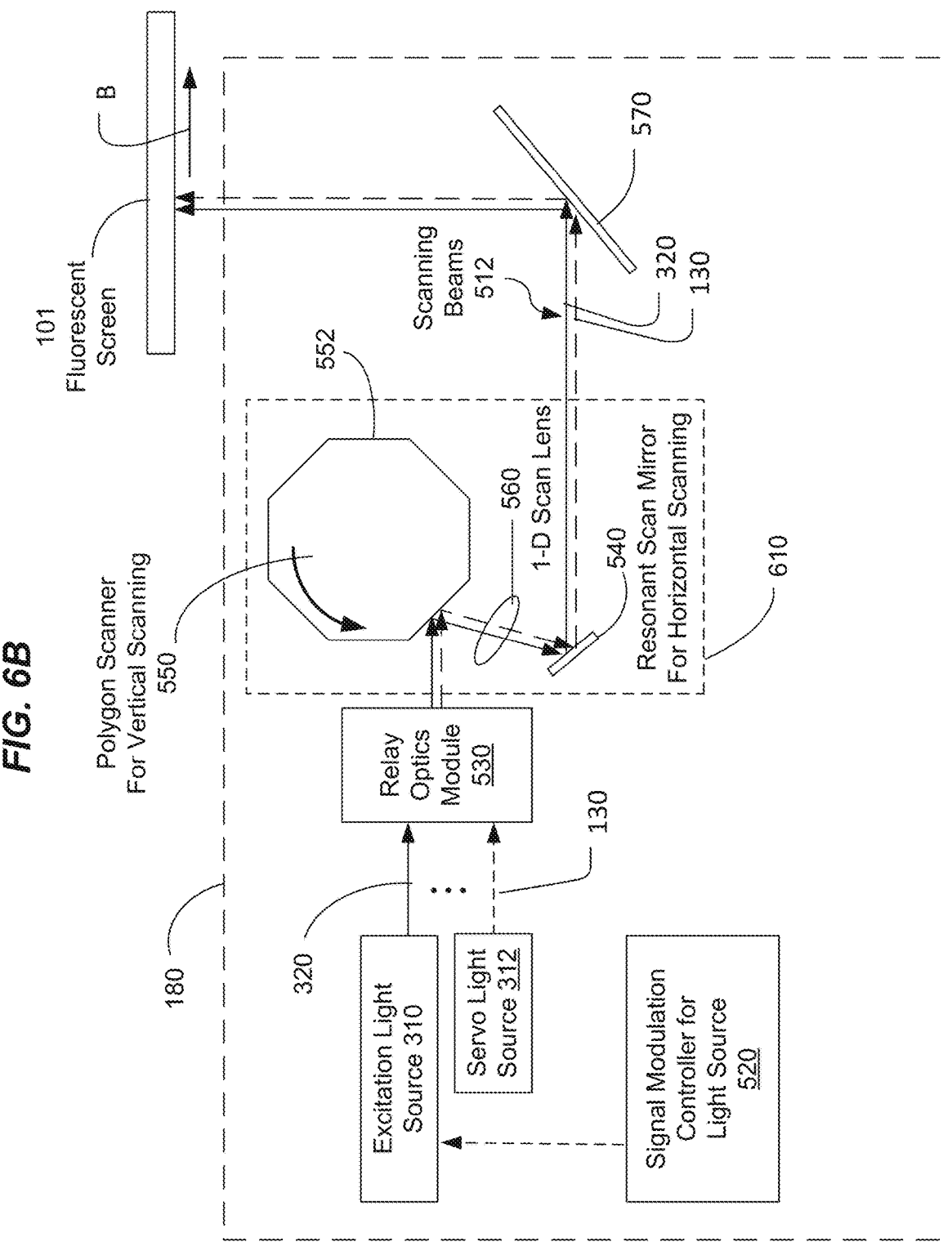
FIG. 6B is a schematic diagram of an example implementation of a post-objective scanning beam display configuration.
Figure 6C:
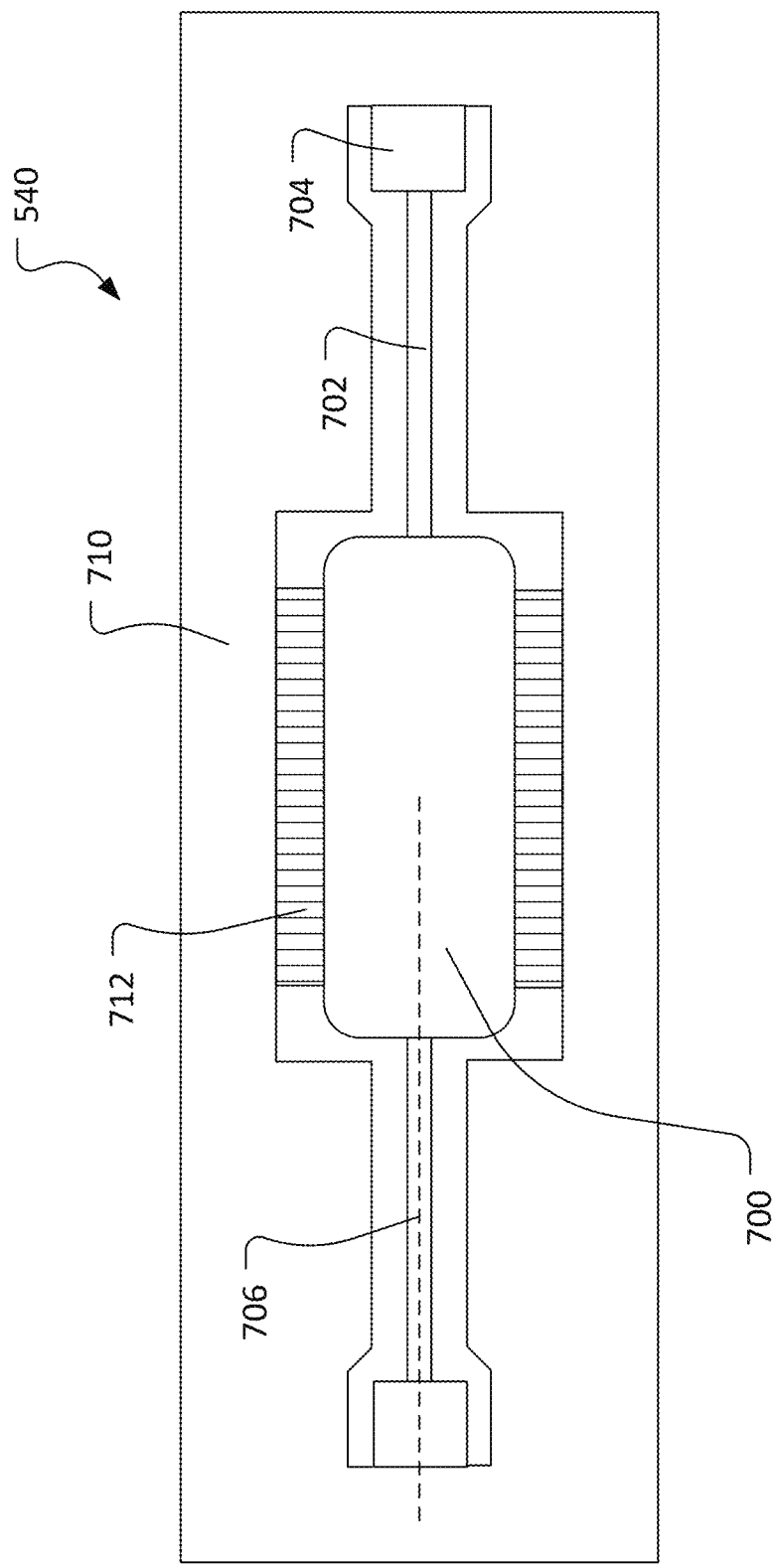
FIG. 6C is a schematic top view of a resonant scanning mirror.

Referring to FIG. 6C, a resonant scanning mirror 540 generally includes a mirror plate 700 suspended above or in a cavity of a substrate 710, e.g., an etched silicon wafer. The mirror plate 700 can be coupled by struts 702 and a torsional spring 704 to the remainder of the substrate 710. The torsional spring 704 permits the mirror 700 to rotate about an axis 706 that extends along the struts 702. Fingers can extend from the mirror and from the substrate 710 to form an interdigited comb actuator 712. By applying an AC voltage to the fingers of the substrate in the comb actuator 712, the mirror 700 can be caused to oscillate about the axis 706. The resonant scanning mirror 540 can be quite small, e.g., 1 mm diameter. However, proper positioning of the relay optics 530 can keep the beams 130, 320 targeted on the scanning mirror 540.

Returning to FIG. 6A, the scanning projection module also includes a "linear scanning mirror" 550, i.e., a scanning mirror that is configured to cause the beams 130, 320 to traverse the slow scanning direction, e.g., the vertical scanning direction, at a substantially uniform speed. The linear scanning mirror also scans the beams 512 along a single axis, e.g., the slow scanning direction. Examples of linear scanning mirrors include a multi-facet polygon mirror scanner or a galvo scanning mirror. A galvo scanning mirror uses a coil and magnet to move the mirror.

A multi-facet polygon mirror 550 includes a rotatable polygon with multiple reflective facets 552. The number of facets, N, can be between 6 and 25, e.g., between 8 and 20. The mirror 550 can be rotated by a motor, and the rotation speed can be set by a controller, e.g., display controller 220. Due to the rotation of the polygon mirror 550, the beams 512 are swept across the display screen in the slow scan direction (as shown by arrow B). Each facet 552 of the polygon mirror 550 can have the same angle of inclination relative to the axis of rotation of the polygon mirror 550. In particular, each facet 552 can be parallel to the axis of rotation. The polygon can be a regular polygon, and axis of rotation can pass through the center of the polygon. The resonant scanning mirror 540 can be placed quite close to the polygon mirror 550, e.g., the distance between the resonant scanning mirror 540 and the closest facet can be about 3-6 mm.

Optionally, a scan lens 560 can be included to focus the excitation beam 320 and servo beam 130 from the polygon scanner 550 onto the screen 101. The scan lens 560 is designed to image each beam 512 onto the screen 101. Each of reflective facet of the polygon scanner 550 simultaneously scans the two scanning beams 512 (the excitation beam 320 and servo beam 130). However, in some implementations there is no lens in the optical path between the polygon scanner 550 and the screen 101.

A fold mirror 570 can be located in the optical path of the scanning beams 512 between the linear scanning mirror 550 and the display screen 101 to reflect the beams 512 toward the display screen 101. The fold mirror 570 is positioned and oriented so that light beams that are directed from the fold mirror 570 to the screen 101 and that reflect back from screen 101 hit the fold mirror 570 at an angle such that the second reflection from the fold mirror will not hit the screen 101.

The various components, e.g., servo light source 312, relay optics module 530 and scanning projection module 610, can be configured such that the servo beam 130 is collinear with the excitation beam 320. In some implementations, the components are configured such that the servo beam 130 travels a path parallel with the excitation beam 320. In particular, the path of the servo beam 130 on the screen can be collinear with the path of the excitation beam 320 on the screen. The servo beam 130 can be slightly in advance or trailing (e.g., by 10-15 mm) of the excitation beam 320 along the fast-scan direction of travel, e.g., direction A. However, the servo beam 130 is not separated from the excitation beam 320 by more than the spacing between servo lines 602 (see FIG. 10).

In the example illustrated in FIG. 6A, the scanning beams 512 are first directed to the resonant scanning mirror 540 and then from the resonant scanning mirror 540 to the polygon scanner 550. Alternatively, as shown in the example illustrated in FIG. 6B, the scanning beams 512 are first directed to the polygon scanner 550 and then from the polygon scanner 550 to the resonant scanning mirror 540.

In order to increase the resolution of the display system 100 without using multiple excitation beams 320, the polygon scanner 550 can be used in an "interlaced" mode with each facet providing a different field, i.e., a different set of scan lines along the fast scan-direction generated by the resonant scanning mirror 540.

Figure 7:
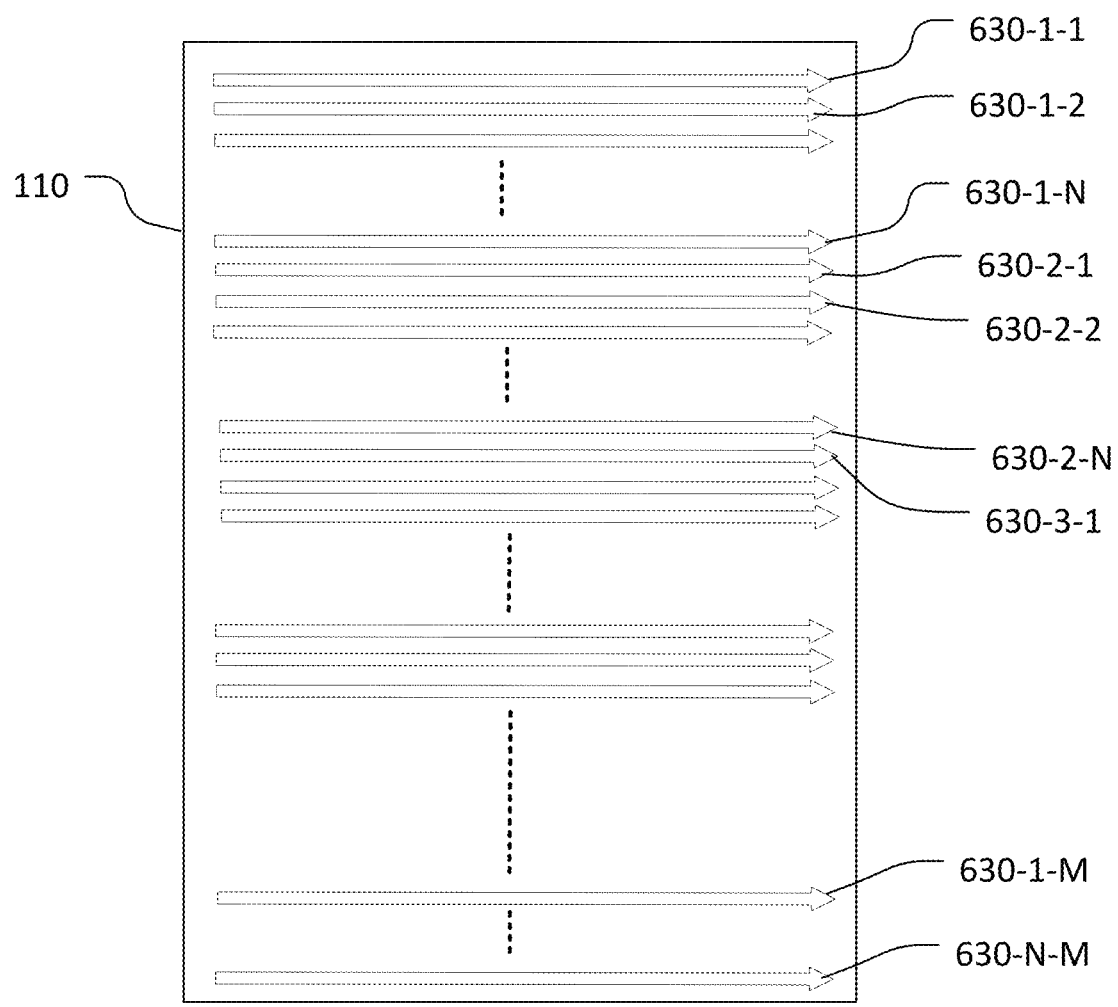
FIG. 7 is a schematic illustration of scan lines from multiple fields in a display region.

For example, as shown in FIG. 7, a single field generated during reflection of the excitation beam 320 from a first facet can include scan lines scans 630-1-1, 630-2-1, ... 630-M-1. If the excitation beam is activated only when the beam is travelling in one direction, M is at most the number of oscillations of the resonant scanning mirror 540 along the fast scan direction, e.g., horizontally, during a scan by a single facet of the polygon mirror scanner 550 along the slow scan direction, e.g., vertically. If the excitation beam is activated both when the beam is travelling forward and back along the fast scan direction, M is at most twice the number of oscillations of the resonant scanning mirror 540 during a scan by a single facet of the polygon mirror scanner 550. A subsequent single field generated during reflection of the excitation beam 320 from a second facet can include scan lines scans 630-2-1, 630-2-2, ... 630-2-M. Assuming that the polygon includes N facets, the Nth field generated during reflection of the excitation beam 320 from the Nth facet can include multiple scan lines scans 630-N-1, 630-N-2, ... 630-N-M. Thus, a pair of adjacent scan lines from the same field are separated by (N−1) scan lines from the other fields.

One technique to provide N fields from an N-facet polygon is to fabricate the polygon mirror 550 such that each facet 552 has a slightly different angle relative to the axis of rotation of the polygon mirror 550. The different angles permit each subsequent facet 552 to generate the horizontal scans in a new field position relative to the prior facet. However, a problem with this approach is that fabrication of polygon mirrors with precise angles to achieve these offset fields is difficult, and thus the polygon mirror scanner is either very costly or the scan lines of the different fields are not uniformly spaced.

An alternative approach to achieve N fields with an N-facet polygon mirror 550, without the facets being at different angles, is offset the polygon frequency (i.e., the rotation rate of the polygon mirror 550) by a certain fraction of a resonant scanner frequency (i.e., the oscillation rate of the resonant mirror scanner 540). This permits each facet 552 to paint the fast-scan pattern in a new field. The scan pattern will be back in phase with the original scan pattern after N facets, or one revolution of the polygon mirror 550.

In particular, the polygon frequency can meet the equation:

$$f_{poly} = \frac{f_{res}}{N(Z+\delta)}$$

where Z is an integer that is equal to the number of fast-scan cycles per facet; and δ is a irreducible fraction that is an integer multiple of 1/N. For example, if the polygon has 8 facets, 8 fields can be realized if Z is an integer and δ=1/8, 3/8, 5/8 or 7/8. In some implementations, $f_{res}$ is about 20-23 kHz, N is 8-16, e.g., 11 or 12, and Z is 24-40, e.g., 32 or 33.

The number of horizontal scanner cycles per facet (Z) need not be (and often is not) equal to the number of lines painted on the region 110 of the display screen 101. Assuming one resonant scanner cycle paints 2 horizontal lines, the number of lines painted on the screen (L) is:

$$L = 2Z \frac{\alpha_{scan}}{\alpha_{facet}}$$

where $\alpha_{scan}$ is the angle the polygon mirror 550 subtends while painting the lines on the screen, and $\alpha_{facet}$ is the angle each facet 552 subtends ($\alpha_{facet}$=360°/N). $\alpha_{scan}/\alpha_{facet}$ is also known as the polygon efficiency.

One benefits of this approach over having facets with different angles is that the polygon mirror 550 can be made as a perfect regular polygon, thus saving set-up time in the manufacture and inspection of the polygon. Another benefits of this approach is that no facet sensor is required to match the video content with the field.

Figure 8:
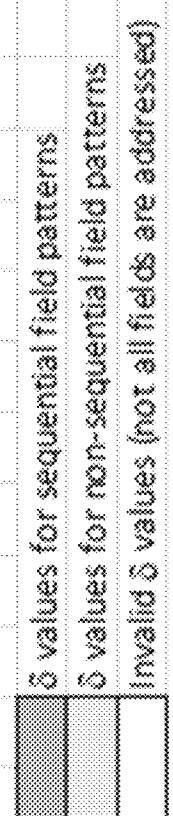
FIG. 8 is table illustrating permissible values for use in calculation of polygon rotation frequency.

Note that if δ=(N−1)/N a sequential field pattern is also realized, except that the field sequence is reversed from the δ=1/N case. Non-sequential field patterns can be realized with the δ values shown in FIG. 8.

In some implementations, not all of the facets of the polygon are used. In this situation, the excitation beam is deactivated for one or more facets. For example, eight facets of a nine-sided polygon could be used; the excitation beam could be deactivated for the ninth face. This situation is treated as N=8. The "skipped" facet can be used for timing purposes or for activating and deactivating some of the beams. For example, the servo beam could be activated or deactivated during the "skipped" facet.

Figure 9:
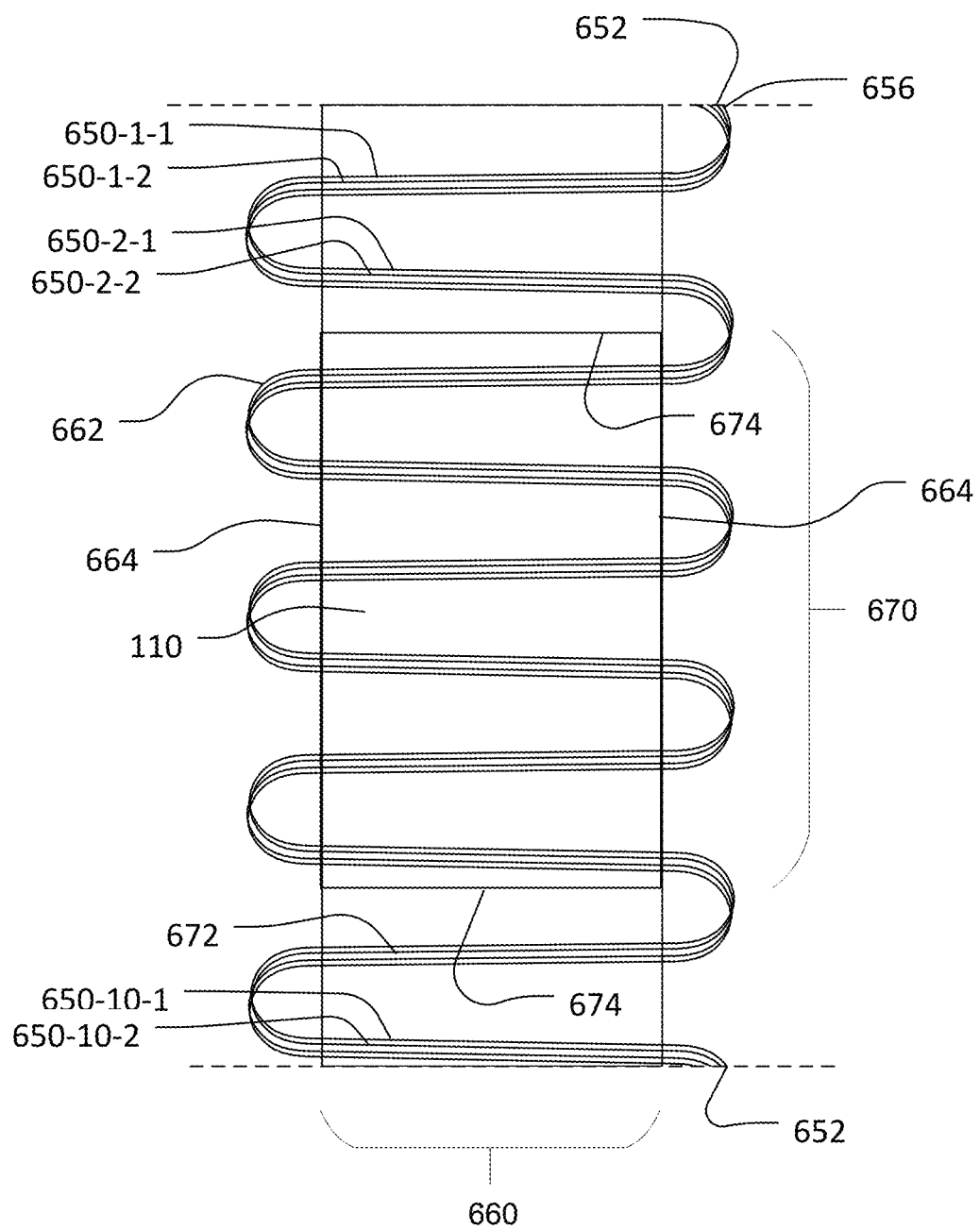
FIG. 9 is a schematic illustration of scan lines from multiple fields in a display region as generated by an oscillating resonant scanning mirror.

FIG. 9 illustrates scan lines 650 generated by the combination of the rotating polygon mirror and the resonant scanning mirror. This illustration is for the particular configuration of Z=10 and δ=1/11, but the principles are generally applicable for other configurations. In particular, assuming that the slow scan direction is from the top down, during reflection from a first facet of the polygon mirror, the resonant mirror scanner will cause the beams 512 to scan along a first scan path that includes scan lines 650-1-1, 650-2-1, . . . 650-10-1.

The combination of the resonant mirror and the rotating polygon can result in a sinusoidal scan path. However, along the fast scan direction, the edges 664 of the display region 110 can be selected to correspond to the generally linear portions (the scan lines 650-1, etc.) of the scan path. The excitation beam need be activated only during a portion 660 of the scan path that is within these edges 664 of display region 110. This cuts off the highly curved sections 662 of the sinusoidal scan path to avoid distracting visual effects.

In addition, along the slow scan direction, the edges 674 of the display region 110 can be selected to correspond to the usable surface of the facet, e.g., where the light beam does not partially overlap two facets. The excitation beam need be activated only during a portion 670 of the scan path that is within these edges 674 of display region 110. This cuts off the sections 672 of the scan path where the light beam is being reflected by multiple facets, and thus avoids display defects. The portion of the scan path that lies within the display region provides a first field for the display region 110.

If the excitation beam source were active, at the point where the light beam would transition over the edge of the polygon (shown as 652), the scan path snaps back to a position above the display region 110 (shown as 654). In particular, the scan path snaps back to a position that corresponds to the start of the second scan path for the next facet. Then, during reflection from the second facet of the polygon mirror, the resonant mirror scanner will cause the beams 512 to scan along the second scan path that includes scan lines 650-1-2, 650-2-2, . . . 650-10-2. Again, the excitation beam need be activated only during a portion of the scan path that corresponds to the display region 110. This provides a second field for the display region 110.

This process is repeated a number of times equal to the number of facets, or one revolution of the polygon mirror, until the scan path is in phase with the first scan path (shown at 656). This provides a number of fields equal to the number of facets, e.g., 6-18, e.g., 11 in the example (not all the scan paths are illustrated for clarity in the drawing).

The excitation beam 320 is scanned spatially across the screen 101 to hit different color phosphors at different times. Accordingly, the modulated beam 320 carries the image signals for the red, green and blue colors for each pixel at different times and for different pixels at different times. Hence, the modulated beam 320 is coded with image information for different phosphors at different times by the signal modulation controller 520. The excitation beam scanning thus maps the time-domain coded image signals in the beam 320 onto the spatial phosphor locations on the screen 101 for generating the pixels in the image. For example, the modulated beam 320 can have each color pixel time equally divided into three sequential time slots for the three color subpixels for the three different color channels. The modulation of the beam 320 may use pulse modulation techniques to produce desired grey scales in each color, a proper color combination in each pixel, and desired image brightness.

Figure 10:
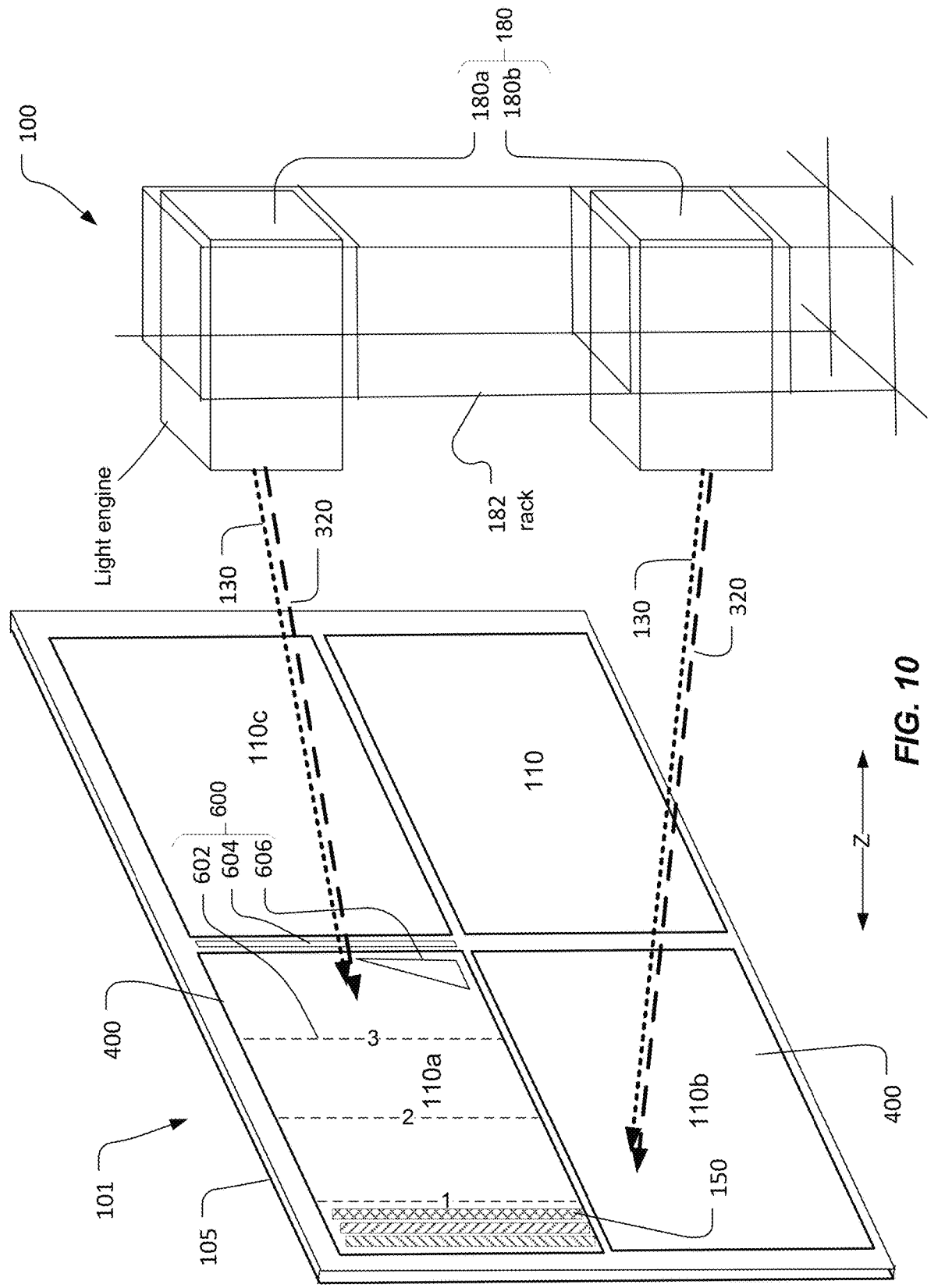
FIG. 10 is a schematic perspective view of an example of multiple scanning beams being used to address multiple display regions of a display screen.

FIG. 10 illustrates a scanning beam display 100 that includes a screen 101 being addressed by multiple scanning beam engines 180, e.g., scanning beam engines 180a and 180b. The scanning beam engines 180 are secured to a rack 182 to maintain the engines 180 in a fixed position relative to each other in all three axes.

Each scanning beam engine generates a single excitation beam 320 to address a different region 110. For example the excitation beam 320 from engine 180a can address region 110a, and the excitation beam from engine 180 can address region 110b. Each region 110 can include the parallel fluorescent stripes 150 (only three stripes are illustrated so that location of the scribe marks 600 can be shown). In some implementations, each display regions 110 corresponds to one of the panels 400.

The modulation of the excitation beam 320 needs to be coordinated with the position of the excitation beam 320 on the display screen so phosphor locations corresponding to each pixel are modulated with appropriate data. In addition, the excitation beam 320 may need to be deactivated when the beam spot does not completely overlie a fluorescent strip 150, e.g., when the beam is between adjacent stripes 150. For example, a UV excitation beam may need to be deactivated for safety (e.g., to prevent the UV light from passing through the screen 101 to the viewers).

In addition, the excitation beam 320 may need to be deactivated when beam spot is outside the desired display region 110 for a scanning beam engine 180, e.g., to prevent the excitation beam 320 from activating the phosphor stripes in an adjacent region. The excitation beam 320 can be deactivated when beam spot would fall onto an adjacent panel 400. For example, the excitation beam for the panel of display region 110a can be deactivated when the excitation beam would impinge the panel of display region 110b.

Unfortunately, the components in the beam scanning module 610 are not necessarily stable. For example, the although the resonant scan mirror 540 can operate at a high frequency, e.g., 20-23 kHz, the oscillation frequency can drift. Moreover, the position of the resonant scan mirror 540 cannot be precisely controlled. Furthermore, the resonant scan mirror 540 tends to cause the horizontal position of the excitation beam 320 on the screen 101 to vary non-linearly, e.g., sinusoidally (rather than substantially linearly, as with a rotating polygon mirror or a galvo mirror scanner driven with a triangular wave). As such, the excitation beam 320 cannot be modulated simply on the assumption that the beam is horizontally traversing the screen 101 at a substantially constant speed. Rather, the actual horizontal position of the excitation beam 320 needs to be determined and used to control the modulation of the excitation beam 320.

Various alignment mechanisms can be provided to coordinate the timing of the modulation of the excitation beam 320 with the position of the scanning beam 320. In particular, a feedback mechanism can be used to monitor the horizontal (and vertical) position of the scanning beam.

The feedback mechanism include reference marks 600 on the display screen 101. The reference marks can be between the fluorescent stripes and/or overlying the fluorescent stripes and/or in one or more peripheral areas outside the fluorescent area. The reference marks can reflect servo light to create feedback light, and the feedback light can be measured by using one or more optical servo sensors to produce one or more feedback servo signals. A servo control in the scanning beam engine 180 processes this feedback servo signal to extract the information on the beam positioning and other properties of the beam on the screen and, in response, adjust the timing of the modulation of the excitation beam 320 to ensure the pixels are modulated with the proper data.

In some implementations, a designated servo beam is scanned over the screen by the same scanning module that scans the image-carrying excitation optical beam. This designated servo beam is used to provide servo feedback control over the scanning excitation beam to ensure proper optical alignment and accurate delivery of optical pulses in the excitation beam during normal display operation. This designated servo beam has an optical wavelength different from that of the excitation beam. As an example, this designated servo beam can be an infrared (IR) servo beam that may be invisible to the human eye. The examples below use an IR servo beam 130 to illustrate features and operations of this designated servo beam.

Figure 11:
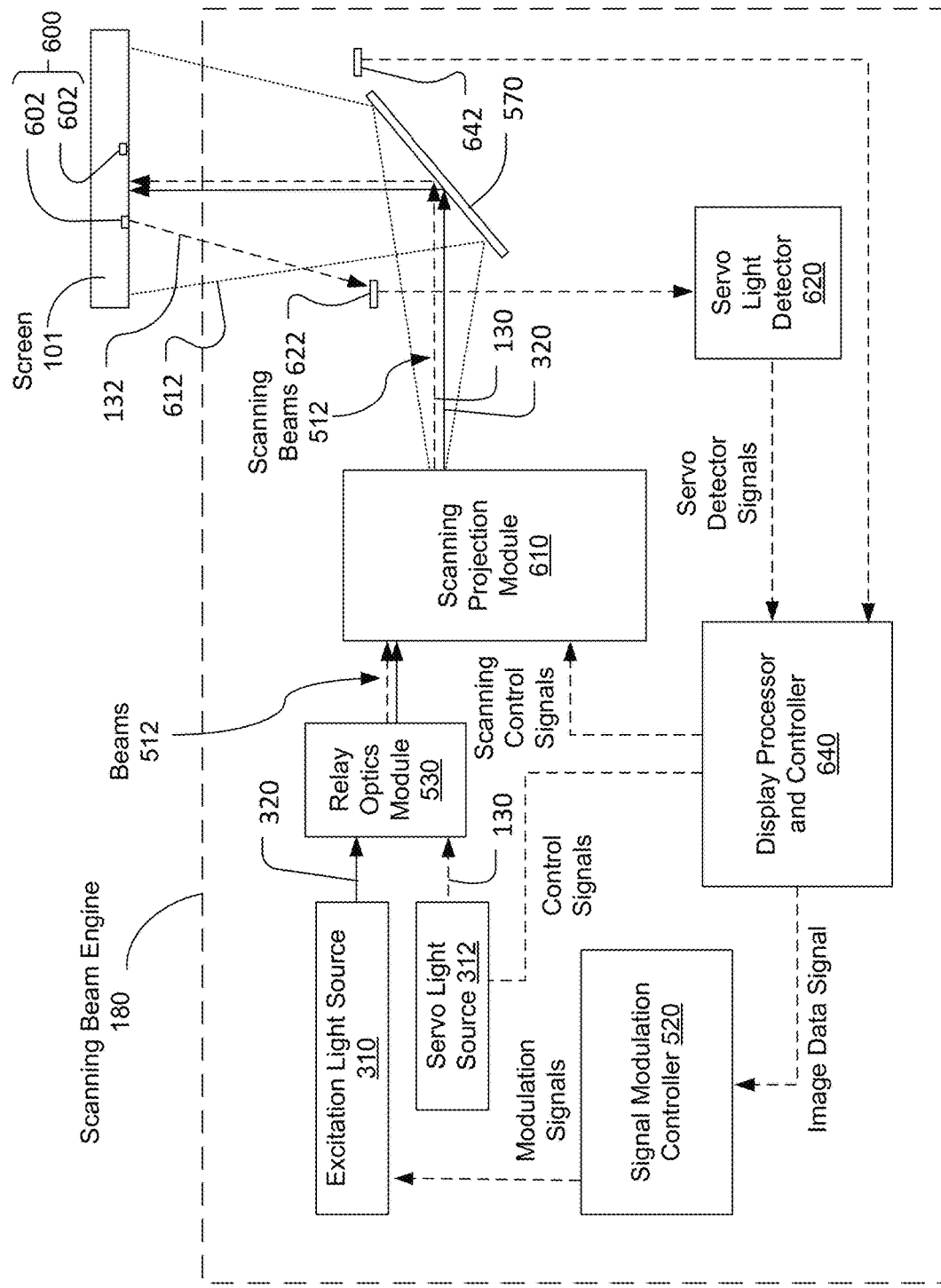
FIG. 11 is a schematic diagram of an example of a scanning display system using a servo feedback control based on a scanning servo beam.

Referring to FIGS. 10 and 11, each scanning beam engine 180 can produce a servo beam 130, e.g., an infrared beam. The scanning beam engine 180 scans the servo beam 130 on the screen 101 along with the excitation beam 320. Unlike the excitation beam 320, the servo beam 130 need not be modulated to carry image data. Thus, the servo beam 130 can be a continuous wave beam. Alternatively, the servo beam 130 can be turned on when expected to be in the general scan region of the reference marks, and otherwise turned off. In either case, the servo beam 130 is not modulated with image data.

The servo beam 130 can be invisible to the human eye and thus not produce any noticeable visual artifact on the screen 101 during the normal operation of the system when images are produced on the screen 101. For example, the servo beam 130 can be an infrared beam, e.g., have a wavelength in a range from 780 nm to 820 nm. For safety concerns, the screen 101 can be made to have a filter that blocks the invisible servo beam 130 and/or the excitation beam 320 from exiting the screen 101 on the viewer side. Similarly the display screen 101 can include a dichroic filter that reflects the servo beam 130 but allows passage of the excitation beam 320. In this regard, a cutoff absorbing filter with a bandpass transmission range only in the visible spectral range (e.g., from 420 nm to 680 nm) may be used to block the servo beam 130 and the excitation beam 320. The servo control of the excitation beam 320 based on the servo beam 130 can be performed dynamically during the normal operation of the system. This servo design avoids manipulation of the image-producing excitation beam 320 during the normal display mode for servo operations and thus avoids any visual artifacts that may be caused by the servo-related manipulation of the image-producing excitation beam 320.

As shown in FIGS. 6A and 6B, the servo beam 130 is directed along with the excitation beam 320 through the same optical path in the scanning beam engine 180. A light source 312 for generating the servo beam 130 can be a semiconductor laser in a light source module, e.g., the same module that generates the excitation beam 320. The servo beam 130 can be overlapped with a scanning path of the excitation beam 320 or travel along its own scanning path that is different from a path of any of the excitation beams 320. The positioning of the various components is fixed such that the spatial relation between the servo beam 130 and each excitation beam 320 is fixed and known through a calibration process. Consequently, the positioning of the servo beam 130 on the screen 101 can be used to determine the positioning of the excitation beam 320.

Returning to FIGS. 10 and 11, servo reference marks on the screen 101 can produce feedback light 132. The servo beam 130 has a known spatial relation with the excitation beam 320. Therefore, the positioning of the servo beam 130 can be used to determine the positioning of the excitation beam 320. This relationship between the servo beam 130 and the excitation beam 320 can be determined by using reference servo marks such as a start of line (SOL) mark in a non-viewing area of the screen 101. The scanning beam engine 180 receives and detects the feedback light 132 to obtain positioning information of the servo beam 130 on the screen 101 and uses this positioning information to timing of modulation of the excitation beam 320.

FIG. 11 illustrates a scanning beam display system based on a servo control using the servo beam 130. A display processor and controller 640 can be used to provide control functions and control intelligence based on one or more servo detector signals from one or more radiation servo detectors 620 that detect servo feedback light 132 from the screen 101. A single detector 620 may be sufficient, although two or more servo detectors 620 can be used to improve the servo detection sensitivity.

A plurality of servo reference marks 600 are included in the screen 101. The servo reference marks on the screen 101 can produce feedback light 132. Each servo reference mark 600 has a different reflectivity to the servo beam 130 than the surrounding area, and thus the detector 620 can detect the change in intensity when the servo beam 130 scans across the reference mark. Alternatively or in addition, the detectors 620 can also be used to collect excitation servo light 122 produced by scattering or reflecting the excitation beam 320 at the screen to provide additional feedback signals to the processor and controller 640 for the servo control.

In FIG. 11, a scanning projection module 610 is provided to scan and project the excitation beam 320 and servo beam 130 onto the screen 101. The module 610 can be in a post-objective configuration or a pre-objective configuration. As illustrated, the image data is fed to the display processor and controller 640 which produces an image data signal carrying the image data to the signal modulator controller 520 for the light sources 310, e.g., the excitation laser. The servo light source 312 need not be modulated to carry image data. Where the light sources are lasers, the signal modulation controller 520 can include a laser driver circuit that produces a laser modulation control signal carrying image signals with image data assigned to the laser 310. The laser control signal is then applied to modulate the laser 310, e.g., the current for a laser diode to produce the laser beam 320.

The display processor and controller 640 also produces control signals to the signal modulation controller 520 to synchronize the modulation with the horizontal position of the beam 320 on the screen 101. In other words, the controller 640 can determine a horizontal position of the beam 320 based on the signal from the servo light detector 620. Based on the horizontal position, the controller 640 determines which image data should be used to modulate the excitation beam 320, and adjusts the timing of the modulation such that appropriate data is used to modulate respective pixels.

In addition, the controller 640 can selectively deactivate the excitation light source 310 for certain portions of the horizontal scan time. This can be used to compensate for the sinusoidal dwell time of the light beam along the horizontal axis caused by the resonant scan mirror.

As noted above, the reference marks 600 are made to be optically different from the areas surrounding and between the reference marks 600 to allow for optical detection of the reference marks 600 and thus to register the position of the servo beam 130 and excitation beams 320. The reference marks 600 can be formed on the screen 101 while maintaining the substantially the same optical transmission for the excitation beam 320 as the areas surrounding and between the reference marks 600. Therefore, the presence of the servo reference marks 600 does not optically interfere with the optical transmission of the excitation beam 320.

The servo reference marks 600 can be implemented in various configurations. For example, each servo reference mark 600 can be specularly reflective to light of the servo beam 130, and the areas surrounding and between the reference marks 600 can be configured to be either transmissive, absorptive, or diffusely reflective. Assuming that the detector 620 is positioned on the incidence angle of the servo beam 130 on the screen to receive specularly reflected light, there will be a sudden increase intensity of the feedback light 132 each time the servo beam 320 crosses the reference mark 600.

Alternatively, the servo reference marks 600 can also be made diffusively reflective to light of the servo beam 130, and the areas surrounding and between the marks 600 can be specularly reflective. Assuming that the detector 620 is positioned off the incidence angle of the servo beam on the screen 101 so as to receive diffusely reflected light, there will be a sudden increase intensity of the feedback light 132 each time the servo beam 320 crosses a reference mark 600.

Returning to FIG. 10, the display screen 101 can include one or more servo reference marks 600. A variety of different shapes or functions are possible for the reference marks 600. The display screen 101 can include multiple reference marks, and the display screen 101 can include or more servo reference of different shapes or functions.

For example, the display screen 101 can include one or more servo scribe lines 602 that extend parallel to the stripes 150, e.g., vertically, in the display region 110. Each time the servo beam 130 crosses a scribe lines 602, there will be a change (e.g., an increase in intensity for a diffuse mark on a specular background with the detector off the incidence angle) in the intensity of the feedback light 132. The controller 640 (see FIG. 8) can receive the signals from the detector 620 and determine the time at which the servo beam 130 crosses the mark 602. Because the scribe lines 610 are in a known position relative to the fluorescent stripes 150, and the excitation beam 320 is in a known position relative to the servo beam 130, the controller 640 can determine the horizontal position of the excitation beam 320 relative to the fluorescent stripes 150.

An initial calibration of the position (e.g., in terms of laser timing) of the excitation beam 320 relative to the servo beam 130 can be accomplished by a "self-mapping" process carried out by the controller 640. For self-mapping, the engine 180 can include an additional sensor 642 that detects reflection of the excitation beam 320, e.g., detect reflection of UV light. The sensor 642 can have a complete view (either directly, or off the fold mirror 570, or in as combination) of the inside of the display region 110, e.g., the panel 400, and can detect when the excitation beam 310 laser crosses each servo mark 602.

To perform the calibration, the controller 640 causes the scanning engine 180 to sweep the excitation beam 320 and servo beam 130 across the display region 110, and measures the time difference between detection of the excitation beam 310 and the servo beam 130 from the same servo mark 602. From this time difference, the controller 640 can calculate the horizontal position of the excitation beam 320 relative to the fluorescent stripes 150 based on the oscillation rate of the resonant mirror scanner 540. Because the offset distance (time) between the excitation and servo light spots can slightly vary across the display region 110, the timing difference can be collected for multiple positions across the display region 110. This data can be used subsequently used by the controller 640 during normal operation, e.g., the offset at a given location can be determined by the controller 640 based on interpolation between measured timing differences from the two or three nearest locations.

Assuming the servo beam 130 crosses a given mark 602 twice per oscillation (e.g., once as the resonant scan mirror is swinging left, and once as the resonant scan mirror is swinging right), the controller can determine the oscillation rate of the resonant scan mirror. For example, the controller can detect two consecutive times the times that the servo beam crosses a given mark 602, and then calculating a difference between the two times. The controller can calculate an oscillation rate from the time difference.

Then, the horizontal position of the excitation beam can be determined based on the time at which the servo beam 130 crosses the mark 604. For example, the controller 640 can store a predetermined function that models the horizontal position of the excitation position as a function of time. For example, the function can be a sinusoidal function. The horizontal position can then be calculated using the known time, the predetermined function, and the oscillation rate. For example, the oscillation rate can be used as a scaling factor for the predetermined function.

Alternatively, if the marks 600s are distributed with a sufficiently high density across the screen 101, e.g., if there is scribe line 602 after each tuple of differently colored fluorescent stripes 150, the horizontal position can be determined directly without modelling of the motion of the excitation beam. The controller 640 can simply count the number of pulses from the detector 620; this number will correspond to the position of the excitation beam.

The display screen 101 can optionally include at least one mark 604 of different shape or size than the scribe line 602. For example, the mark 604 can be wider along the scan direction. The mark 604 is positioned at a known horizontal position relative to the fluorescent stripes 150. The mark 604 could be at an edge of the display region 101 or in a center of the display region. Each time the servo beam 130 crosses the servo mark 604, there will be a change in the intensity of the feedback light 132. The controller 640 (see FIG. 11) can receive the signals from the detector 620 and determine the time at which the servo beam 130 crosses the mark 604. The mark 604 can be distinguished from the marks 602 by the controller based the duration of the signal, e.g., the wider mark results in a pulse. The controller 640 can use detection of the mark 604 to reset the count the number of pulses from the detector 620 generated by the marks 602.

In addition, the display screen 101 can include one or marks 606 that provide a signal that can be used to determine a vertical position of the servo beam 130. For example, the mark 606 can have a triangular shape. If the servo beam 130 crosses the mark 606 in a thin section of the triangle, there be a change in the intensity of the feedback light 132 for a short period of time. If the servo beam 130 crosses the mark 606 in a wider section of the triangle, there be a change in the intensity of the feedback light 132 for a short period of time. Therefore the duration of the change in the intensity (e.g., a duration of a step in the signal) can be used by the controller 640 to determine a vertical position of the excitation beam 320.

The controller 640 can also determine a rotation rate (or an equivalent such as number of facets per second) of the polygon scan mirror 550. Since the servo beam 130 vertically crosses mark 606 once per facet of the polygon scan mirror, by detecting two consecutive times the times that the servo beam crosses the mark, and then calculating a difference between the two times, the controller 640 can determine an amount of time per facet, and thus a facet frequency or rotation rate of the polygon scan mirror 550. A mark along a top or bottom edge of the panel could be used instead of mark 606.

Turning again to FIG. 11, in some implementations the servo light detector 620 operates as a Lambertian detector. In particular, the marks 600 can include thin servo stripes 602 printed on the inside the screen 101, e.g., on the inside of each panel 400. The servo stripes 602 can be extend parallel to the phosphor stripes 150, and can be positioned between the phosphor stripes 150 such that they do not obscure the phosphor stripes 150 from the excitation beam 320, e.g., the UV laser beam. The servo stripes 602 can be spaced apart by more than a single pixel, e.g., can be spaced every 10-20 pixels. The servo stripes 602 can be reflective at least to the servo beam 130 and can diffusively scatter the light of the servo beam 130 substantially according to Lambert's cosine law. In some implementations, the servo stripes are diffusively reflective to both IR and UV light. The inside of the display screen 101, e.g., the inside of the panel 400, can otherwise be a specular surface to the light of the servo beam 130. The light scattered by a servo stripe 602 can be discerned by circuitry in the detector 620 from the low-scatter background of the display screen. Detection of this servo light provides the timing signal as discussed above.

The servo light detector 620 can include one or more light sensors 622, e.g., photodiodes. The implementation illustrated in FIG. 11 includes a single light sensor 622. The sensor(s) 622 can be configured to detect in wavelength ranges that exclude the wavelengths used by excitation beam 320, e.g., exclude UV wavelengths. This help ensure that the servo light detector 620 is not confused by the excitation beam 320 crossing the servo marks 600. In some implementations, the light sensor(s) 622 are configured to detect in wavelength ranges that exclude the visible wavelengths generated by the phosphor stripes 150. In some implementations, the light sensor(s) detect exclusively in the wavelength range of the servo light 130, e.g., in the IR wavelengths.

The sensor(s) 622 are positioned outside of the light cone 612 from the scanning projection module 610 to the display screen 101. If a single sensor 622 is present, the sensor 622 has a complete view of the display region 110, e.g., of a single panel 400. In terms of distance and orientation relative to the display screen, the more distant the sensor 622 is from the screen 101, the weaker the signal becomes due to the r-squared law. On the other hand, the closer the sensor 622 is to the display screen 101 or fold mirror 570, the weaker the signal from the remote corners becomes due to Lambert's cosine law. Optimal positioning and orientation of sensor(s) 622 can be determined by computer modelling of these constraints.

Figure 12:
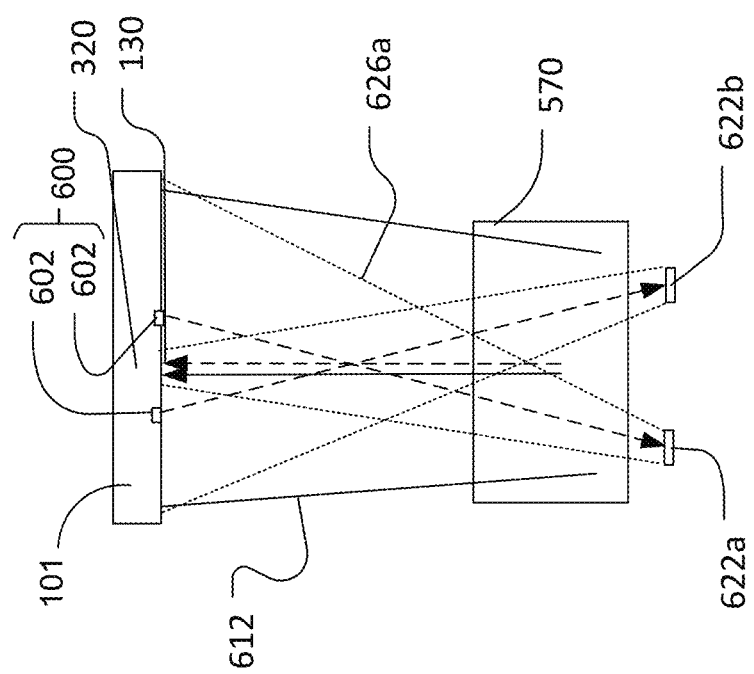
FIG. 12 is a schematic top view of a portion of a scanning display system illustrating multiple optical sensors for a servo light detector.

In some implementations, the servo light detector 620 includes multiple light sensors. Referring to FIG. 12, in some implementations, the servo light detector 620 includes a first and second sensors 622a, 622b. In the view of FIG. 12, the excitation beam 320 and the servo beam 130 are being projected onto the folding mirror 570 from above the page. As shown in FIG. 12, the first and second sensors 622a, 622b are positioned opposite sides of the vertical plane passing through the centerline of the light cone 612. In addition, the first and second sensors 622a, 622b are positioned behind (relative to the screen 101) the portion of the light cone extending from the scanning projection module 610 to the folding mirror 570. In some implementations, the first and second sensors 622a, 622b are positioned behind the folding mirror. In some implementations, the first and second sensors 622a, 622b are positioned above the folding mirror 570. In some implementations, the first and second sensors 622a, 622b are positioned in front of the folding mirror 570; in this case, the first and second sensors 622a, 622b are positioned on opposite sides of the portion of the light cone 612 reflected from the folding mirror 570 to the screen 101.

In implementations with two sensors, the two sensors can have views of different portions, e.g., opposite portions (relative to the sensors themselves), of the display region 110 of the screen 101. For example, the first sensor 622a, positioned on the left side, can have a field of view 626a of the right side of the display region 110. Similarly, the second sensor 622b, positioned on the right side, can have a field of view 626b of the left side of the display region 110. The controller 640 can alternate between receiving signals from the first sensor 622a and the second sensor 622b, based on the position of the excitation beam 320. For example, when the excitation beam 320 is on the right side of the display region 110, the controller 640 can receive signals from the first sensor 622a (and ignore signals from the second sensor 622b). Similarly, when the excitation beam 320 is on the left side of the display region 110, the controller 640 can receive signals from the second sensor 622b (and ignore signals from the first sensor 622a). Handing off detection duty between the two to sensors 622a, 622b helps prevent the servo light detector 620 from receiving a direct "hit" from a beam reflected from a specular portion of the display screen. This can reduce the risk of "blinding" specular reflection from the inside surface of the display screen 101.

In implementations with a single sensor 622, the servo beam 130 can be deactivated during portions of the scan where the beam would be specularly reflected back to the sensor 622. Again, this can reduce the risk of "blinding" specular reflection from the inside surface of the display screen 101. The controller 640 can interpolate the servo beam position (and thus excitation beam position) for the region where the servo beam 130 is turned off based on the measurements of servo beam positions from the nearest servo marks 600.

Figure 13:
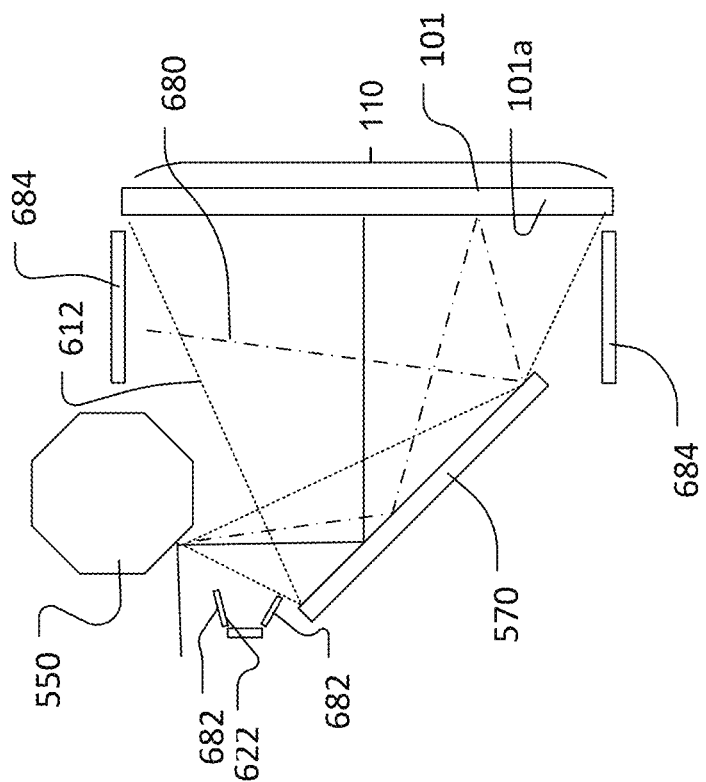
FIG. 13 is a schematic side view of a portion of a scanning display system illustrating positions for baffles and a folding mirror.

Referring to FIG. 13, because portions of the inside surface 101a of the display screen 101 are specularly reflective, secondary reflections 680 (i.e., reflections of the servo beam from a display region 110 and then from the folding mirror 570) can accidentally impinge a sensor of the optical engine 180 for the display region 110 or the sensor of another display region. Several techniques can be used to mitigate this possibility. First, baffles 682 can be placed around each sensor 622 to limit the angles at which light can reach the sensor 622. Second, optical components can be placed as far from the inside surface 101a of the display screen 101 as possible. Third, interior surfaces of the display housing, that surrounds the light sources, scanning projection module 610 and fold mirror 570, can be angled such that reflected light is not directed toward the detector or back towards the display screen. Fourth, components within the display housing that do not perform optical transmission or reflection, and the interior surface of the display housing, can be covered with diffuse black paint or a light absorbing material. Fifth, secondary reflections 680 can be blocked by baffles 684 that are positioned along the common edges between two display regions 110. As shown in FIG. 13, such baffles 684 can extend perpendicular to the surface of the display screen 101. The baffles 684 can be spaced apart from the inside surface 101a of the display screen 101, e.g., by 10 to 20 mm. Sixth, the angle of incidence of the servo beam 130 can be symmetric across the display region 110 on the display screen 101. This can minimize depth of the system 100 and meet the acceptance angle of any color mirror film in the display screen 101.

Figure 14:
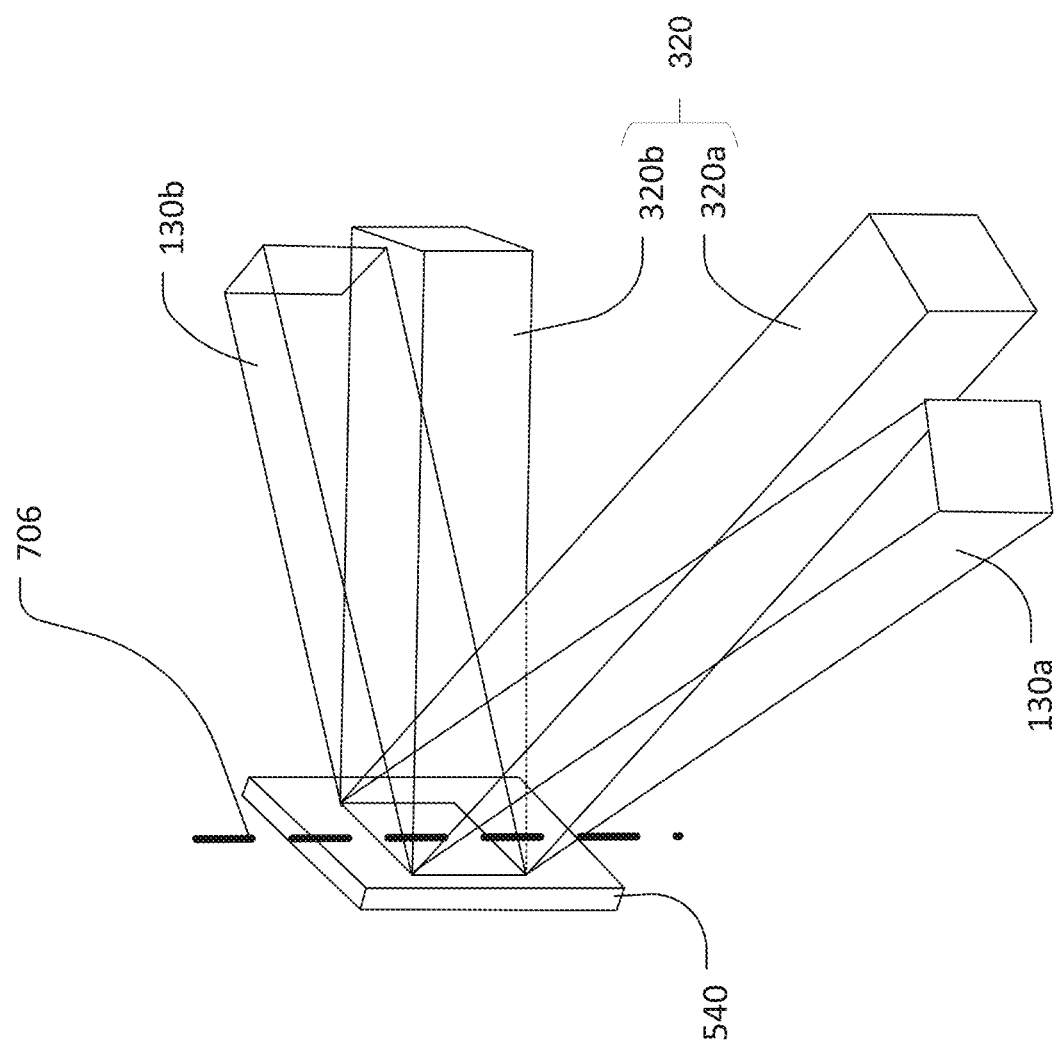
FIG. 14 is a schematic perspective view of an excitation beam and a servo beam impinging the resonant mirror scanner.

Referring to FIG. 14, the excitation beam 320 can impinge the resonant mirror scanner 540 perpendicular to the rotational axis 706 of the mirror scanner. This can reduce distortion (variation in theta x). The incoming excitation beam 320a can impinge the resonant mirror scanner 540 at an oblique angle relative to the surface of the mirror, so that the reflected beam 320b is directed away from its source. In some implementations, the line along which the incoming excitation beam 320a travels intersects the rotational axis 706 (the excitation beam itself might not intersect the axis 706, as the axis may recessed relative to the surface of the mirror, so the excitation beam is reflected before it reaches the axis 706).

Similarly, the incoming servo beam 130a can impinge the resonant mirror scanner 540 at an oblique angle relative to the surface of the mirror, so that the reflected beam 130b is directed away from its source. The excitation beam 320 and the servo beam 130 can be aligned to have different angles of incidence on the mirror scanner 540, but to impinge the same location, on the mirror scanner 540. That is, the excitation beam 320 and servo beam 130 are coaligned on the resonant mirror scanner 540. The different incidence angles permit the servo beam 130 to lead or lag relative to the excitation beam 320, while achieving a small aperture size necessary for having both beams incident on a MEMs device.

Referring to FIGS. 9 and 10, a portion of the scan path of the excitation beam 320 for a particular engine 180 extends beyond the edges of the display region 110 for that engine 180. As such, a portion of the scan path of the servo beam 130 also extends beyond the edges of the display region 110. For example, for display region 110a, curved portions 668 extending to the right of right edge 664 of display region 110a would extend into display region 110c. Similarly, for display region 110a, scan lines 672 extending below the bottom edge 664 of display region 110a would extend into display region 110b. As such, the servo beam 130 generated by an engine 180 for one display region can cross over into another display region and be detected. This results in cross-talk of the servo signals. For example, the servo beam 130 generated by engine 180a can cross over into display regions 110b and 110c, and can be detected by the servo light detectors 620 for those display regions.

As shown in FIG. 13, baffles 684 can be placed at the common borders of adjacent display regions 110. This can helpful in reducing cross-talk. However, in order to make complete use of the display screen 101 and avoid gaps between the display regions, it is desirable for the display regions 110 to abut or even very slightly overlap. As such, the baffles 684 must be spaced sufficiently back from the inner surface of the screen 101 to provide an optical path from the scanning projection module 610 to the edges of the display region 110. As a practical matter, this provides some space for the servo beam 130 for one display region to reach an adjacent display region.

Another technique that could be used to reduce servo light cross-talk is to use multiple sensors that view different portions of the display region (e.g., as shown in FIG. 12), and then maintain the servo beams of all the display regions in phase, e.g., have each beam be at the same relative position along its scan path. However, this requires complex synchronization techniques and multiple sensors, each of which increases costs.

An alternative approach to reducing servo light cross-talk is to have different light engines 180 take turns activating their servo beams 130. In particular, the controller 640 can operate the system 100 such that no two adjacent display regions 110 have their servo beams 130 activated at the same time.

Figure 15A:
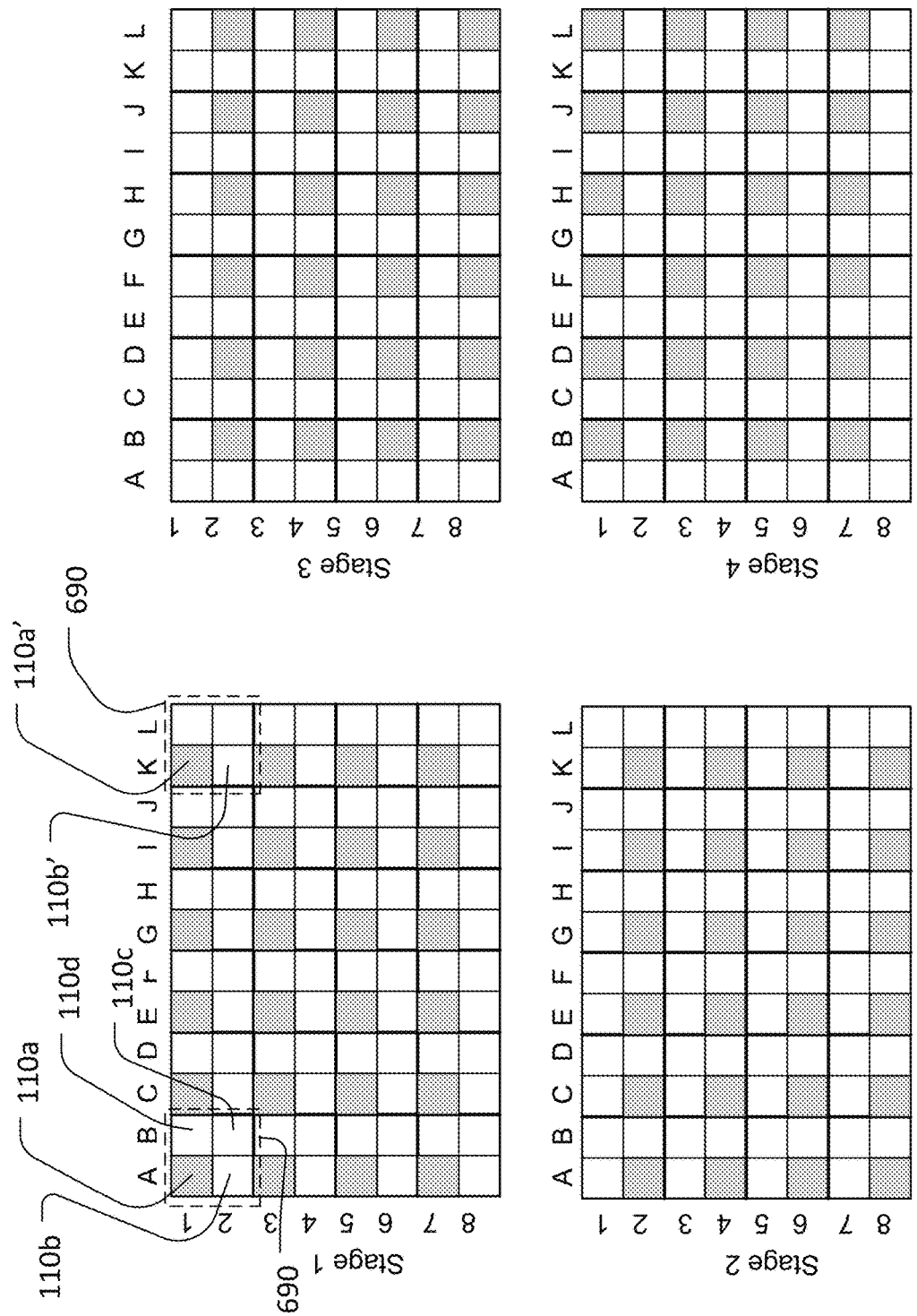
FIGS. 15A and 15B are schematic illustrations showing sequences of activation of light engines from blocks of light engines.

FIG. 15A illustrates a sequence in which the servo beams 130 are activated for some display regions while deactivated for other display regions. In particular, the servo beam is activated for the darker display region (e.g., region 110a in stage 1), and is not activated in the lighter display regions (e.g., regions 110b, 110c, and 110d in stage 1).

Although FIG. 15A illustrates a display that is eight display regions high and twelve display regions wide, other configurations could be used. The display 101 is split into blocks of display regions. Each block is a contiguous group of adjacent display regions. Each block can have the same number of display regions and be of the same shape. For example, block 690 is a 2×2 block that includes display regions 110a, 110b, 110c, 110d; the other blocks can similarly be 2×2 blocks. In the implementation illustrated, each block includes four display regions, but there could be a larger number. The block of regions can be rectangular.

The system 100 cycles through the display regions in each block. The cycle has multiple stages, e.g., a number of stages equal to the number of display regions in the block. In particular, at each stage in the cycle, the system 100 simultaneously activates, for all of the blocks, the servo beam 130 for the display region that has the same relative position within the block. For example, in "stage 1", display regions 110a and 110a' are activated; in the "stage 2", display regions 110b and 110b' are activated, etc. By activating the servo beam of the light engines in the same relative positions in neighboring 2×2 blocks, there are no light engines that are adjacent to each other activated at the same time.

Figure 15B:
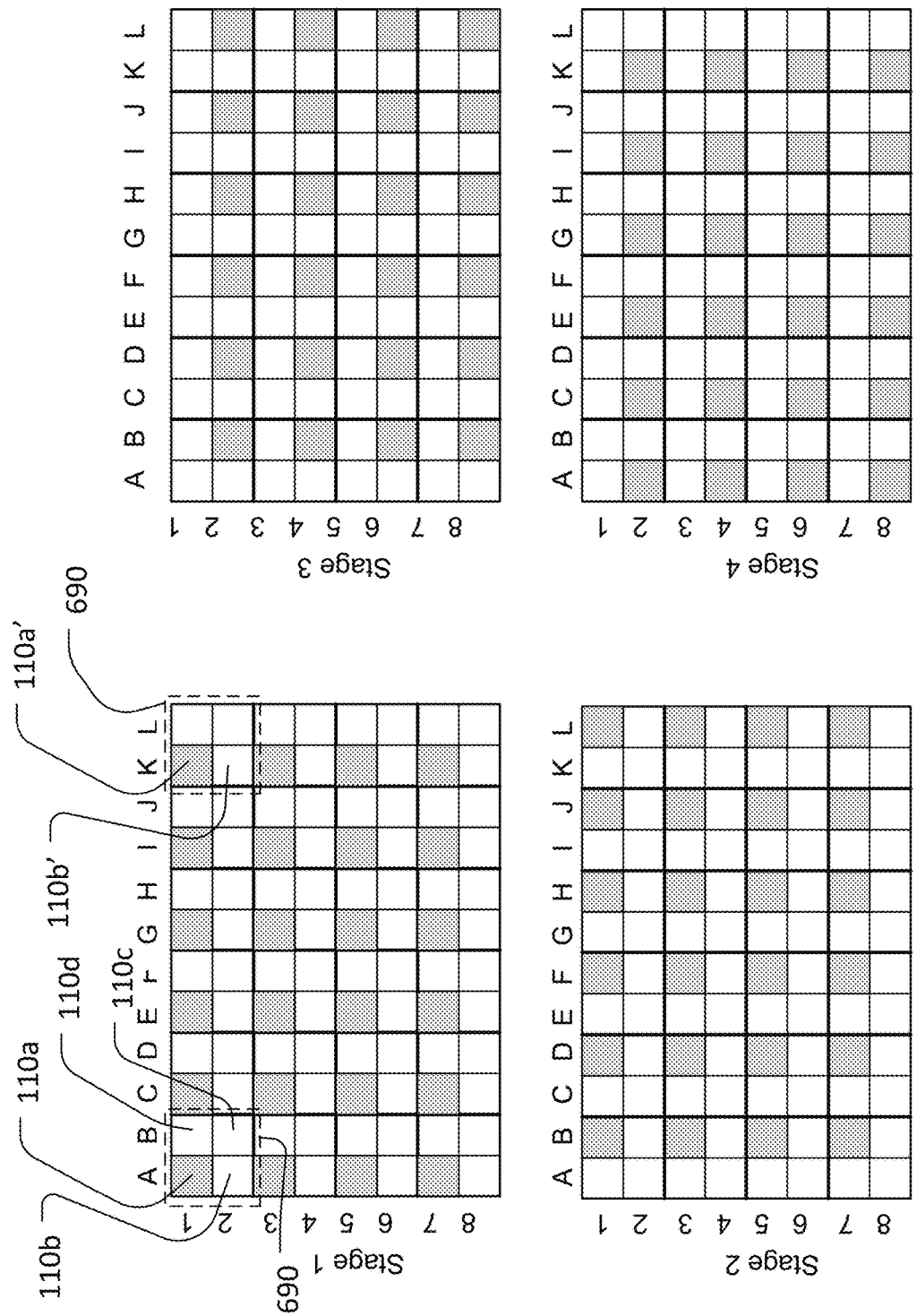

FIG. 15A illustrates a sequence in which the activated light engine proceeds counter-clockwise around the block; FIG. 15B illustrates a sequence in which the activated light engine proceeds counter-clockwise around the block; other sequences are possible.

Each stage in the sequence can last for at least one full rotation of the polygon, e.g., one frame of image data. In some implementations, each stage can last for multiple rotations of the polygon, e.g., two or three rotations. Thus, the system proceeds through the sequence very quickly, e.g., multiple times per second. In some implementations, some stages can last less than a full rotation of the polygon, e.g., for just 2-3 facets. Each stage can last for the same number of rotations or same fraction of a rotation, and the number of rotations or fraction of a rotation can be preset. Alternatively, different stages can last for different numbers of rotations or different fractions of a rotation.

For engines 180 in which the servo beam 130 has been deactivated during a stage of the cycle, the controller 640 can calculate the servo beam position (and thus excitation beam position) based on prior measurements of the position of the servo beam, the oscillation rate of the resonant scan mirror, and the rotation rate of the polygon scan mirror. The oscillation rate of the resonant scan mirror can be determined by the controller 640 based on timing measurements as discussed above, e.g., from the most recent one or more stages in which the servo beam 130 for that engine was active. Similarly, the rotation rate of the polygonal scan mirror can be determined by the controller 640 based on the timing measurements as discussed above, e.g., from the last one or more stages in which the servo beam 130 for that engine was active. Alternatively, the rotation rate of the polygonal scan mirror can simply be stored as a predetermined value. In general, the controller can calculate the positions under the assumption that the oscillation rate and rotation rate remain constant over the period of time in which the servo beam is deactivated. Since this can be only three to nine rotations of the polygonal scan mirror (e.g., three stages each lasting three rotation), this should be a reasonable assumption.

Each controller 640 can include a timer and can be programmed to activate servo beam 130 for a preset amount of time, e.g., 0.5 seconds, and then deactivate the servo beam 130 for a preset amount of time, e.g., 1.5 seconds. By having the timers offset for the different display regions within the block, the activated servo beam can cycle through the display regions in the block. An advantage of this approach is that it does not require communication between the engines 180. If necessary, a clock signal can be sent, e.g., from the central display control 210 (see FIG. 1C), to maintain the timers in synchronization.

The display system 100 can also include an optical sensor positioned to monitor the intensity of the light emitted by the phosphors. This data can be fed to the controller 640, which can be configured to control the intensity of the excitation beam so that any particular grey scale level will provide uniform brightness across the display screen. The controller 640 can also be configured to detect laser power decay based on the signal from the optical sensor.

The controller can be implemented in digital electronic circuitry, or in computer software, firmware, or hardware, or in combinations of them. The controller can be implemented using one or more computer program products, i.e., one or more computer programs tangibly embodied in a non-transitory machine readable storage media, for execution by, or to control the operation of, data processing apparatus, e.g., a programmable processor, a computer, or multiple processors or computers.

In some portions of this description, the position or movement of the light beams is discussed. Depending on context, this can refers to the position or movement of the spot of impingement of the light beam on the screen.

While this patent application contains many specifics, these should not be construed as limitations on the scope of an invention or of what may be claimed, but rather as descriptions of features specific to particular embodiments of the invention. Certain features that are described in this patent application in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this patent application. For example The separate servo beam can be omitted, and the excitation beams 320 can be used as the servo beam. In this case, servo reference marks on the screen 101 can have different reflectivity to excitation beam 320 than surrounding areas, thereby producing feedback light 132.

A single display region 110 can be scanned by more than one excitation beam 320. For example, multiple excitation beams can be fed through the scanning projection module 610 and reflected in common from the polygon mirror and resonant scan mirror.

Accordingly, other embodiments are within the scope of the following claims.

What is claimed is:
1. A display system comprising:
a display screen;
a light source to generate a light beam that is modulated in accordance with image data;
a beam scanning module to receive the light beams and to direct the light beam onto an associated display region of the display screen, the beam scanning module including
a resonant scanning mirror configured to scan the light beam along a first scanning direction across the associated display region, and a rotating N-faceted polygon scanning mirror to scan the light beam along a second scanning direction across the associated display region such that in operation a combination of oscillation of the scanning mirror and rotation of the polygon scanning mirror creates a serpentine scan path for the light beam; and a controller configured to set a ratio between an oscillating frequency $f_{RES}$ of the resonant scanning mirror and a rotation frequency $f_{POLY}$ of the polygon scanning mirror such that the scan path completes a cycle each n facets, wherein n is an integer greater than 2 and no more than N;

wherein the beam scanning module is configured to cause, for a first facet of the n facets, the light beam to follow a path including a first plurality of scan lines extending primarily along the first scanning direction and spaced apart along the second scanning direction, and to cause, for a second facet of the n facets, the light beam to follow a path that includes a second plurality of scan lines extending primarily along the first scanning direction and spaced apart along the second scanning direction, the first plurality of scan lines interlaced with the second plurality of scan lines.

2. The system of claim 1, wherein N=n.

3. The system of claim 1, wherein n<N, and the light beam is deactivated for (N-n) facets of the polygon scanning mirror.

4. The system of claim 1, wherein $$f_{poly} = \frac{f_{res}}{n(Z+\delta)}$$

where Z is a positive integer, and $0 \le \delta \le 1$.

5. The system of claim 4, wherein $\delta$ is a irreducible fraction that is an integer multiple of 1/n.

6. The system of claim 4, wherein Z is 24-40.

7. The system of claim 4, wherein $\delta=1/n$ or $\delta=(n-1)/n$.

8. The system of claim 1, wherein a lateral position along the first scan direction of an end of the serpentine scan path for the $n^{th}$ facet corresponds to a lateral position along the first scan direction of a start of the serpentine scan path for the $1^{st}$ facet.

9. The system of claim 8, wherein the serpentine scan path comprises a sinusoidal path.

10. The system of claim 1, wherein a scanning speed of the light beam along the first scanning direction is greater than a scanning speed of the light beam along the second scanning direction.

11. The system of claim 1, wherein the display screen comprises fluorescent material, and the light beam is an excitation beam to cause portions of the fluorescent material to fluoresce.

12. The system of claim 11, wherein the fluorescent material comprises parallel stripes of extending along the second scanning direction.

13. The system of claim 1, wherein the resonant scanning mirror causes the light beam to make n' pluralities of interlaced scan lines extending primarily along the first scanning direction across the display region and spaced apart along the second scanning direction, and $1<n'\le N$.

14. The system of claim 1, further comprising a controller configured to receive image data including pixel data representing intensity values of pixels, to split the pixel data into a plurality of fields including a first field corresponding to the first plurality of scan lines and a second field, and to modulate the light beam in accordance with the image data of the first field while the light beam impinges the first facet, and to modulate the light beam in accordance with the image data of the second field while the light beam impinges the second facet.

15. The system of claim 1, wherein each of the first and second pluralities of scan lines comprises the same number of scan lines.

16. The system of claim 15, wherein between 60-80% of the number of scan lines fall within the display region.

17. The system of claim 1, wherein the light beam is deactivated for scan lines positioned beyond opposite edges of the display region that are separated along the second scanning direction.

18. The system of claim 1, wherein the rotating polygon scanning mirror is rotatable about an axis of rotation, and the N facets have a same angle of inclination relative to the axis of rotation.

19. The system of claim 18, wherein the N facets are parallel to the axis of rotation.

* * * * *